US012684581B2

(12) United States Patent
Sun et al.

(10) Patent No.: US 12,684,581 B2
(45) Date of Patent: Jul. 14, 2026

(54) TRANSMISSION OF UPLINK CONTROL INFORMATION (UCI) BASED ON PRIORITY RULES

(71) Applicant: QUALCOMM Incorporated, San Diego, CA (US)

(72) Inventors: Jing Sun, San Diego, CA (US); Kapil Bhattad, Bangalore (IN); Ananta Narayanan Thyagarajan, Bangalore (IN); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 548 days.

(21) Appl. No.: 17/755,803

(22) PCT Filed: Nov. 13, 2020

(86) PCT No.: PCT/US2020/060590
§ 371 (c)(1),
(2) Date: May 9, 2022

(87) PCT Pub. No.: WO2021/097354
PCT Pub. Date: May 20, 2021

(65) Prior Publication Data
US 2022/0386362 A1     Dec. 1, 2022

(30) Foreign Application Priority Data

Nov. 15, 2019   (IN) .............................. 201941046603

(51) Int. Cl.
*H04B 17/318*     (2015.01)
*H04B 17/20*      (2015.01)
(Continued)

(52) U.S. Cl.
CPC .................................. *H04W 72/23* (2023.01)

(58) Field of Classification Search
CPC ..... H04L 5/005; H04L 1/1671; H04L 5/0057; H04L 5/0064; H04L 1/1861;
(Continued)

(56) References Cited

U.S. PATENT DOCUMENTS 11,558,899  B2 *   1/2023  Huang .............. H04W 74/0808
2019/0053097  A1 *  2/2019  Rico Alvarino ...... H04L 5/0064
(Continued)

FOREIGN PATENT DOCUMENTS

CN        109802819 A      5/2019

OTHER PUBLICATIONS

International Search Report and Written Opinion—PCT/US2020/060590—ISA/EPO—Jan. 28, 2021.
(Continued)

*Primary Examiner* — Marcus Smith
*Assistant Examiner* — Jason A Harley
(74) *Attorney, Agent, or Firm* — Harrity & Harrity, LLP

(57)     ABSTRACT

Wireless communications systems and methods related to communications in a network that supports transmission of uplink control information (UCI) data are provided. A user equipment (UE) may determine that a physical uplink control channel (PUCCH) transmission in a time period overlaps with a configured grant resource. The PUCCH transmission may include first UCI including a first number of parts. The UE may determine whether to transmit only the first UCI in a PUCCH resource or to remove at least one part included in the first number of parts and transmit the remaining parts of the first UCI multiplexed with the CG-PUSCH and associated CG-UCI in the configured grant resource. The UE may transmit an uplink (UL) communication signal in accordance with the determination of
(Continued)

1200

Determine, by a user equipment (UE), that a physical uplink control channel (PUCCH) transmission in a time period overlaps with a configured grant resource, the PUCCH transmission including first UL control information (UCI) including a first number of parts, and the configured grant resource including a configured grant UCI (CG-UCI) resource and a configured grant physical uplink shared channel (CG-PUSCH) resource — 1210

Determine, by the UE, whether to transmit the first UCI in a PUCCH resource associated with the PUCCH transmission or to remove at least one part included in the first number of parts based on a set of priority rules — 1220

Transmit, by the UE, an uplink (UL) communication signal in accordance with the determining whether to transmit the first UCI in the PUCCH resource or to remove at least one part included in the first number of parts — 1230 whether to transmit the first UCI in the PUCCH resource or to remove at least one part included in the first number of parts.

40 Claims, 11 Drawing Sheets

(51) Int. Cl.

| | |
|---|---|
| *H04B 17/24* | (2015.01) |
| *H04W 56/00* | (2009.01) |
| *H04W 72/1268* | (2023.01) |
| *H04W 72/21* | (2023.01) |
| *H04W 72/23* | (2023.01) |
| *H04W 72/563* | (2023.01) |
| *H04W 88/02* | (2009.01) |

(58) Field of Classification Search
CPC .... H04L 1/1887; H04L 5/0055; H04W 72/04; H04W 72/21; H04W 72/23; H04W 72/563; H04W 72/1268; H04W 72/56
USPC ......................................................... 370/329
See application file for complete search history.

(56)                       References Cited

U.S. PATENT DOCUMENTS

| 2019/0059013 A1* | 2/2019 | Rahman ................... H04L 1/00 |
|---|---|---|
| 2019/0081737 A1 | 3/2019 | Huang et al. |
| 2019/0230683 A1 | 7/2019 | Akkarakaran et al. |
| 2020/0236673 A1* | 7/2020 | Xu ......................... H04L 1/0028 |
| 2020/0367265 A1* | 11/2020 | Wang .................... H04L 5/0055 |
| 2021/0100024 A1* | 4/2021 | Bang .................... H04L 5/0051 |
| 2021/0105812 A1* | 4/2021 | Rastegardoost .......... H04L 1/08 |
| 2022/0104242 A1* | 3/2022 | Wu ........................ H04L 1/1893 |

OTHER PUBLICATIONS

QUALCOMM Incorporated: "Remaining issues for multiplexing UCI on PUSCH", 3GPP Draft; R1-1802839 Remaining Issues for Multiplexing UCI on PUSCH, 3rd Generation Partnership Project (3GPP), Mobile Competence Centre, 650. Route Des Lucioles, F-06921 Sophia-Antipolis Cedex, vol. RAN WG1, No. Athens, Greece; Feb. 26, 2018-Mar. 2, 2018, Feb. 17, 2018, XP051398252, 13 Pages, Retrieved from the Internet: URL:http://www.3gpp.org/ftp/tsg%5Fran/WG1%5FRL1/TSGR1%5F92/Docs/ [retrieved on Feb. 17, 2018], sections 3 and 5, figures 1,2,4,5.

Intel Corporation: "Enhancements to configured grants for NR-unlicensed", R1-1910643, 3GPP TSG RAN WG1 Meeting #98bis, Chongqing, China, Oct. 14-20, 2019, Oct. 8, 2019, pp. 1-14, Section 2.3.

Intel Corporation: "Enhancements to configured grants for NR-unlicensed", R1-1912200, 3GPP TSG RAN WG1 Meeting #99, Reno, USA, Nov. 18-22, 2019, Nov. 9, 2019, pp. 1-15, Section 2.3.

Interdigital, Inc: "Configured grant UCI for NR-U", R1-1912699, 3GPP TSG RAN WG1 #99, Reno, USA, Nov. 18-22, 2019, Nov. 9, 2019, 5 Pages, Section 2.

* cited by examiner

Configured Grant Resource
300

CG-UCI Resource
302

CG-PUSCH Resource
304

FIG. 3

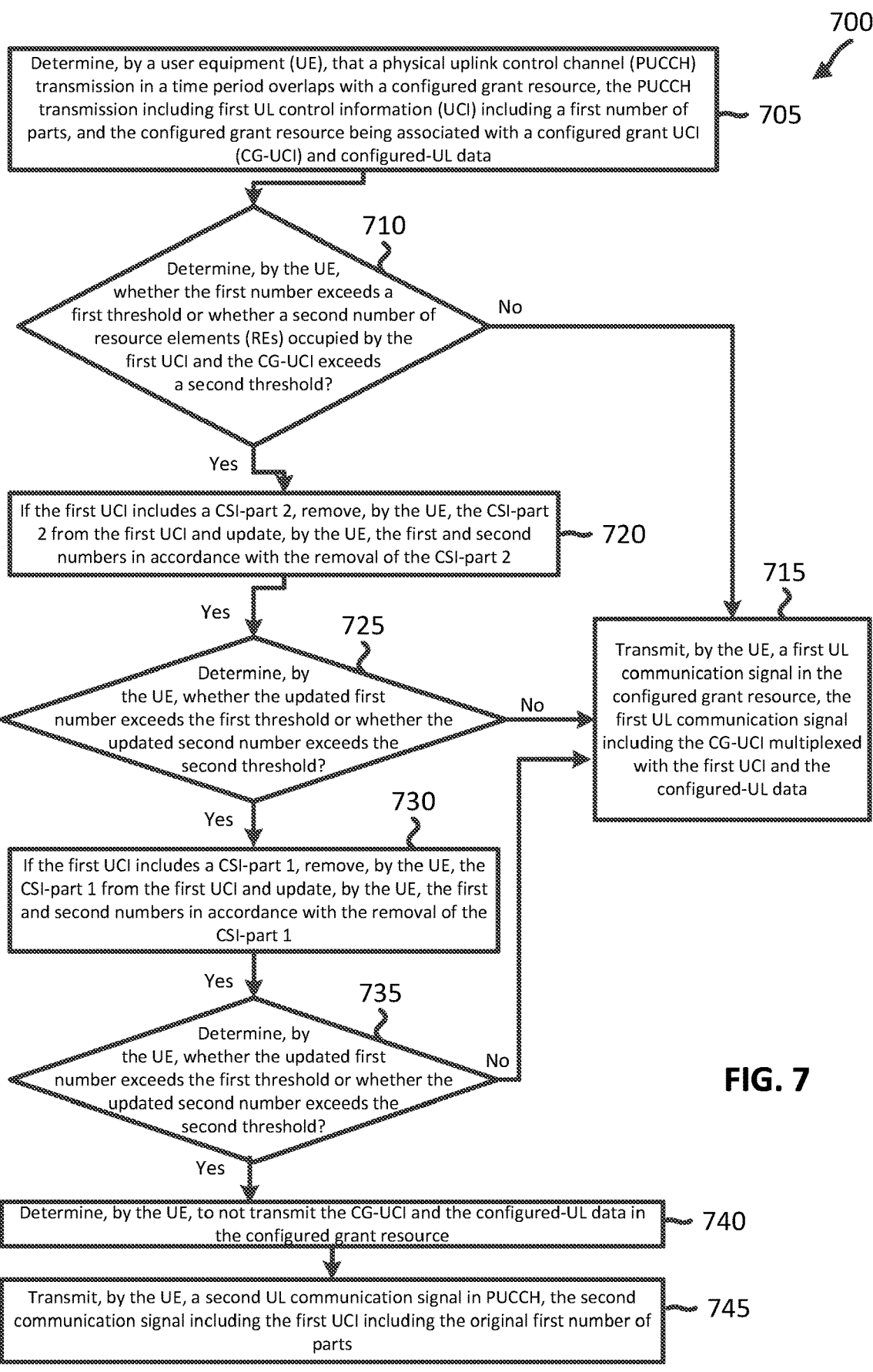

700

Determine, by a user equipment (UE), that a physical uplink control channel (PUCCH) transmission in a time period overlaps with a configured grant resource, the PUCCH transmission including first UL control information (UCI) including a first number of parts, and the configured grant resource being associated with a configured grant UCI (CG-UCI) and configured-UL data — 705

710

Determine, by the UE, whether the first number exceeds a first threshold or whether a second number of resource elements (REs) occupied by the first UCI and the CG-UCI exceeds a second threshold?    No Yes If the first UCI includes a CSI-part 2, remove, by the UE, the CSI-part 2 from the first UCI and update, by the UE, the first and second numbers in accordance with the removal of the CSI-part 2 — 720

715

Yes

725

Determine, by the UE, whether the updated first number exceeds the first threshold or whether the updated second number exceeds the second threshold?    No Transmit, by the UE, a first UL communication signal in the configured grant resource, the first UL communication signal including the CG-UCI multiplexed with the first UCI and the configured-UL data

730

Yes

If the first UCI includes a CSI-part 1, remove, by the UE, the CSI-part 1 from the first UCI and update, by the UE, the first and second numbers in accordance with the removal of the CSI-part 1

Yes

735

Determine, by the UE, whether the updated first number exceeds the first threshold or whether the updated second number exceeds the second threshold?    No

FIG. 7

Yes

Determine, by the UE, to not transmit the CG-UCI and the configured-UL data in the configured grant resource — 740

Transmit, by the UE, a second UL communication signal in PUCCH, the second communication signal including the first UCI including the original first number of parts — 745

800

Remove, by a UE, a first subpart of the CSI-part 2 from the first UCI — 805

Update, by the UE, the first and second numbers in accordance with the removal of the first subpart — 810

715

Determine, by the UE, whether the updated first number exceeds the first threshold or whether the updated second number exceeds the second threshold? — 815

No → Transmit, by the UE, a first UL communication signal in the configured grant resource, the first UL communication signal including the CG-UCI multiplexed with the first UCI and the configured-UL data Yes Determine, by the UE, whether the CSI-part 2 includes another subpart — 820

730

No → If the first UCI includes a CSI-part 1, remove, by the UE, the CSI-part 1 from the first UCI and update, by the UE, the first and second numbers in accordance with the removal of the CSI-part 1

Yes

Remove, by a UE, a second subpart of the CSI-part 1 from the first UCI — 905

Update, by the UE, the first and second numbers in accordance with the removal of the second subpart — 910

715

915

Determine, by the UE, whether the updated first number exceeds the first threshold or whether the updated second number exceeds the second threshold?

No → Transmit, by the UE, a first UL communication signal in the configured grant resource, the first UL communication signal including the CG-UCI multiplexed with the first UCI and the configured-UL data Yes

920

740

Determine, by the UE, whether the CSI-part 1 includes another subpart

No → Determine, by the UE, to not transmit the CG-UCI and the configured-UL data in the configured grant resource Yes

FIG. 9

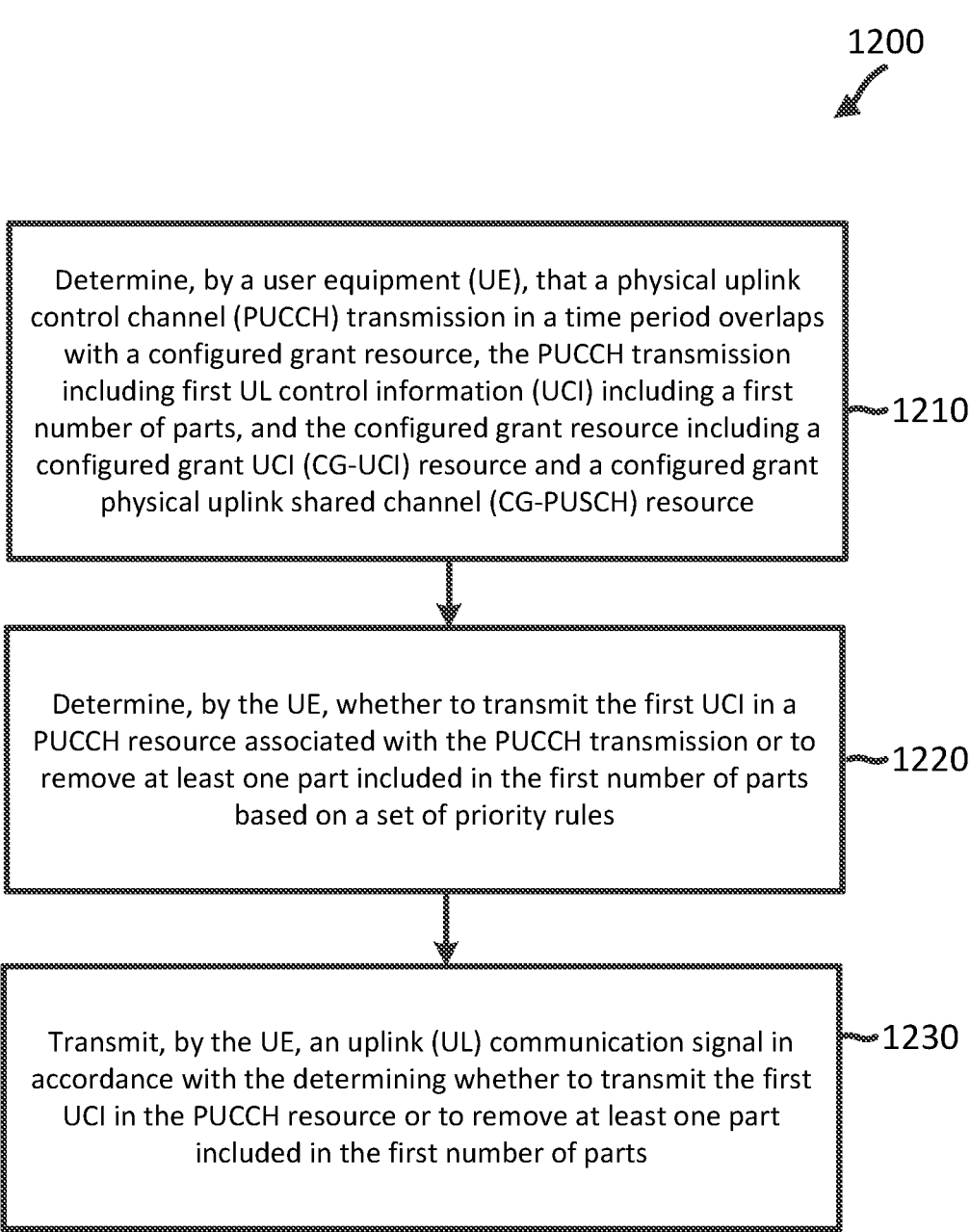

1200

Determine, by a user equipment (UE), that a physical uplink control channel (PUCCH) transmission in a time period overlaps with a configured grant resource, the PUCCH transmission including first UL control information (UCI) including a first number of parts, and the configured grant resource including a configured grant UCI (CG-UCI) resource and a configured grant physical uplink shared channel (CG-PUSCH) resource ⁓1210

Determine, by the UE, whether to transmit the first UCI in a PUCCH resource associated with the PUCCH transmission or to remove at least one part included in the first number of parts based on a set of priority rules ⁓1220

Transmit, by the UE, an uplink (UL) communication signal in accordance with the determining whether to transmit the first UCI in the PUCCH resource or to remove at least one part included in the first number of parts ⁓1230

FIG. 12

TRANSMISSION OF UPLINK CONTROL INFORMATION (UCI) BASED ON PRIORITY RULES

CROSS-REFERENCE TO RELATED APPLICATIONS

The present application is a 35 U.S.C. 371 National Phase entry of Patent Cooperation Treaty (PCT) Application No. PCT/US2020/060590, filed Nov. 13, 2020. The present application further claims priority to and the benefit of Indian Patent Application number 201941046603, filed Nov. 15, 2019. The aforementioned applications are hereby expressly incorporated herein by reference in their entireties.

TECHNICAL FIELD

This application relates to wireless communication systems, and more particularly to transmission of uplink (UL) control information (UCI) based on priority rules.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology. For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes determining, by a user equipment (UE), that a physical uplink control channel (PUCCH) transmission in a time period overlaps with a configured grant resource, the PUCCH transmission including first UL control information (UCI) including a first number of parts, and the configured grant resource including a configured grant UCI (CG-UCI) resource and a configured grant physical uplink shared channel (CG-PUSCH) resource; determining, by the UE, whether to transmit the first UCI in a PUCCH resource associated with the PUCCH transmission or to remove at least one part included in the first number of parts based on a set of priority rules; and transmitting, by the UE, an uplink (UL) communication signal in accordance with the determining whether to transmit the first UCI in the PUCCH resource or to remove at least one part included in the first number of parts.

In an additional aspect of the disclosure, an apparatus includes a processor configured to: determine, by a user equipment (UE), that a physical uplink control channel (PUCCH) transmission in a time period overlaps with a configured grant resource, the PUCCH transmission including first UL control information (UCI) including a first number of parts, and the configured grant resource including a configured grant UCI (CG-UCI) resource and a configured grant physical uplink shared channel (CG-PUSCH) resource; and determine, by the UE, whether to transmit the first UCI in a PUCCH resource associated with the PUCCH transmission or to remove at least one part included in the first number of parts based on a set of priority rules; and a transceiver configured to transmit, by the UE, an uplink (UL) communication signal in accordance with the determining whether to transmit the first UCI in the PUCCH resource or to remove at least one part included in the first number of parts.

In an additional aspect of the disclosure, a computer-readable medium having program code recorded thereon, the program code includes code for causing a user equipment (UE) to determine that a physical uplink control channel (PUCCH) transmission in a time period overlaps with a configured grant resource, the PUCCH transmission including first UL control information (UCI) including a first number of parts, and the configured grant resource including a configured grant UCI (CG-UCI) resource and a configured grant physical uplink shared channel (CG-PUSCH) resource; code for causing the UE to determine whether to transmit the first UCI in a PUCCH resource associated with the PUCCH transmission or to remove at least one part included in the first number of parts based on a set of priority rules; and code for causing the UE to transmit an uplink (UL) communication signal in accordance with the determining whether to transmit the first UCI in the PUCCH resource or to remove at least one part included in the first number of parts.

In an additional aspect of the disclosure, an apparatus includes means for determining, that a physical uplink control channel (PUCCH) transmission in a time period overlaps with a configured grant resource, the PUCCH transmission including first UL control information (UCI) including a first number of parts, and the configured grant resource including a configured grant UCI (CG-UCI) resource and a configured grant physical uplink shared channel (CG-PUSCH) resource; means for determining whether to transmit the first UCI in a PUCCH resource associated with the PUCCH transmission or to remove at least one part included in the first number of parts based on a set of priority rules; and means for transmitting an uplink (UL) communication signal in accordance with the determining whether to transmit the first UCI in the PUCCH resource or to remove at least one part included in the first number of parts.

Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 3 illustrates a configured grant resource according to one or more aspects of the present disclosure.

FIG. 7 is a flow diagram of a communication method according to one or more aspects of the present disclosure.

FIG. 8 is a flow diagram of a communication method for removing subparts of the channel state information (CSI)-part 2 according to one or more aspects of the present disclosure.

FIG. 9 is a flow diagram of a communication method for removing subparts of the CSI-part 1 according to one or more aspects of the present disclosure.

FIG. 12 is a flow diagram of a communication method according to one or more aspects of the present disclosure.

DETAILED DESCRIPTION

Figure 1:
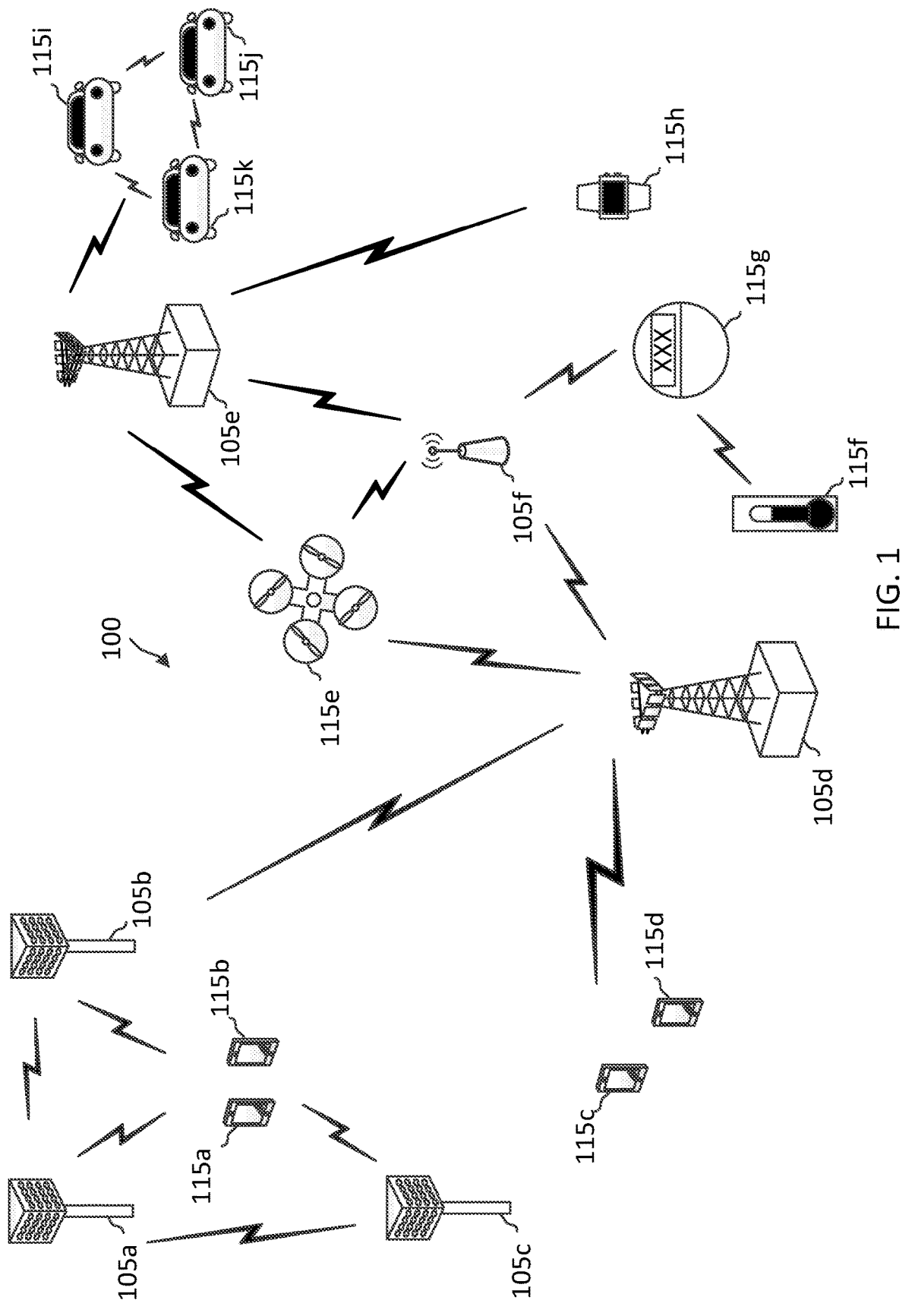
FIG. 1 illustrates a wireless communication network according to one or more aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an Ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing (SCS), may efficiently address operating diverse services across diverse spectrum and diverse deployments. For example, in various outdoor and macro coverage deployments of less than 3 GHz FDD/TDD implementations, SCS may occur with 15 kHz, for example over 5, 10, 20 MHz, and the like bandwidth (BW). For other various outdoor and small cell coverage deployments of TDD greater than 3 GHz, SCS may occur with 30 kHz over 80/100 MHz BW. For other various indoor wideband implementations, using a TDD over the unlicensed portion of the 5 GHz band, the SCS may occur with 60 kHz over a 160 MHz BW. Finally, for various deployments transmitting with mmWave components at a TDD of 28 GHz, the SCS may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects or examples set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

In an embodiment, the network 100 may operate over shared frequency bands or unlicensed frequency bands, for example, at about 3.5 gigahertz (GHz), sub-6 GHz or higher frequencies in the mmWav band. Operations in unlicensed spectrum may include DL transmissions and/or UL transmissions. A UL transmission (e.g., autonomous UL via a dynamic UL grant or scheduled UL transmission via a configured UL grant) in the licensed frequency band may occur under various circumstances. A grantless or grant-free uplink transmission is an unscheduled transmission, performed on the channel without an UL grant.

The present application describes mechanisms for transmission of uplink (UL) control information (UCI) when a PUCCH transmission in a time period overlaps with a configured grant resource. The UCI may include a configured grant UCI (CG-UCI) and/or normal UCI. The normal UCI may also be referred to as first UCI and may include an ACK/NACK, channel state information (CSI), and/or a scheduling request (SR). In some aspects, the UE may apply a set of priority rules of priority rules to determine whether to transmit the UCI in PUCCH or in the configured grant resource. The present application provides techniques for determining, based on the set of priority rules, whether to transmit the first UCI in the PUCCH transmission or to transmit the CG-UCI and the first UCI in the configured grant resource.

FIG. 1 illustrates a wireless communication network 100 according to one or more aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V) communications among the UEs 115i-115k, vehicle-to-everything (V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the SCS between adjacent subcarriers may be fixed, and the total number of subcarriers (K) may be dependent on the system BW. The system BW may also be partitioned into subbands. In other instances, the SCS and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes an UL subframe in an UL frequency band and a DL subframe in a DL frequency band. A subframe may also be referred to as a slot. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate an UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. An UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI, OSI, and/or one or more system information blocks (SIBs). The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS. In some aspects, SIB1 may contain cell access parameters and scheduling information for other SIBs.

After obtaining the MIB, the RMSI and/or the OSI, the UE 115 can perform a random access procedure to establish a connection with the BS 105. After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit an UL communication signal to the BS 105 via a PUSCH and/or PUCCH according to an UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In an embodiment, the network 100 may be an NR network deployed over a licensed or unlicensed spectrum. The network 100 may operate over a shared channel, which may include shared frequency bands or unlicensed frequency bands, for example, at about 3.5 gigahertz (GHz), sub-6 GHz or higher frequencies in the mmWav band. The network 100 may partition a frequency band into multiple channels, for example, each occupying about 20 megahertz (MHz). A wireless communication device may share resources in the shared communication medium and may employ a listen-before-talk (LBT) procedure to reserve transmission opportunities (TXOPs) in the shared medium for communications. TXOPs may be non-continuous in time and may refer to an amount of time a station can send frames when it has won contention for the wireless medium. Each TXOP may include a plurality of slots and one or more medium sensing periods. A TXOP may also be referred to as channel occupancy time (COT).

Figure 2:
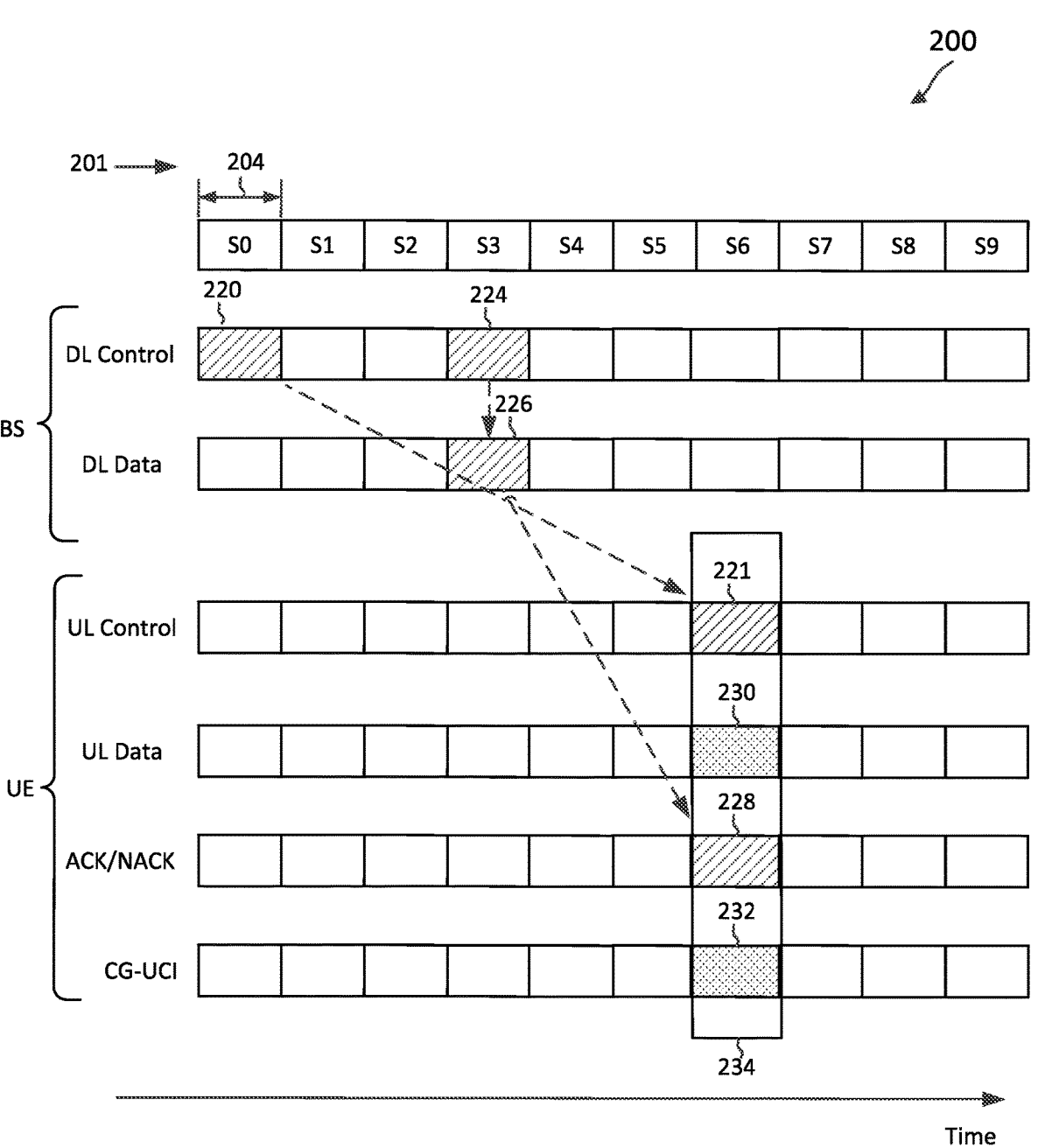
FIG. 2 illustrates a scheduling/configuration timeline according to one or more aspects of the present disclosure.

FIG. 2 illustrates a scheduling/configuration timeline 200 according to one or more aspects of the present disclosure. The scheduling/configuration timeline 200 may correspond to a scheduling/configuration timeline communicated between a BS 105 and a UE 115 of the network 100. In FIG. 2, the x-axis represents time in some constant units. FIG. 2 shows a frame structure 201 including a plurality of slots 204 in time. The slots 204 are indexed from S0 to S9. For example, a BS may communicate with a UE in units of slots 204. The slots 204 may also be referred to as transmission time intervals (TTIs). Each slot 204 or TTI carry a medium access control (MAC) layer transport block. Each slot 204 may include a number of symbols in time and a number of frequency tones in frequency. Each slot 204 may include a DL control portion followed by at least one of a subsequent DL data portion, UL data portion, and/or a UL control portion. In the context of LTE, the DL control portion, the DL data portion, the UL data portion, and the UL control portion may be referred to as a physical downlink control channel (PDCCH), a physical downlink shared channel (PDSCH), a physical uplink shared channel (PUSCH), and a physical uplink control channel (PUCCH), respectively.

The pattern-filled boxes represent transmissions of DL control information (DCI), DL data, UL control information (UCI), UL data, an ACK, and/or a NACK in corresponding slots 204. While an entire slot 204 is pattern-filled, a transmission may occur only in a corresponding portion of the slot 204. As shown, the BS transmits DCI 220 in the slot 204 indexed S0 (e.g., in a DL control portion of the slot 204). The DCI 220 may indicate a UL grant for the UE. The UE transmits UCI 221 to the BS in the slot 204 indexed S6 (e.g., in a UL control portion of the slot 204) based on the UL assignment. The slot 204 indexed S4 is a fourth slot from the slot 204 indexed S0. The UCI 221 is a scheduled UL, which is granted by a UL grant indicated in the DCI 220.

Further, the BS transmits DCI 224 in the slot 204 indexed S3 (e.g., in a DL control portion of the slot 204). The DCI 224 may indicate a DL grant for the UE in the same slot 204 indexed S3. Thus, the BS transmits a DL data signal 226 to the UE in the slot 204 indexed S3 (e.g., in a DL data portion of the slot 204). The UE may receive the DCI 224 and receive the DL data signal 226 based on the DL grant. The DL data signal 226 is a scheduled DL, which is granted by a DL grant indicated in the DCI 224.

After receiving the DL data signal 226, the UE 115 may report a reception status of the DL data signal 226 to the BS by transmitting an acknowledgement (ACK)/negative-acknowledgement (NACK) signal 228. The ACK/NACK signal 228 refers to a feedback signal carrying an ACK or a NACK. The feedback may be an acknowledgement (ACK) indicating that reception of the DL data by the UE is successful or may be a negative-acknowledgement (NACK)

indicating that reception of the DL data by the UE is unsuccessful (e.g., including an error or failing an error correction). The UC may include CSI-part 1, CSI-part 2, and/or the ACK/NACK signal 228. For example, the ACK/ NACK signal 228 may be part of the UCI.

The ACK/NACK signal 228 may be associated with a hybrid automatic repeat request (HARQ) process. In a HARQ process, a transmitting node may transmit various coded versions of information data to a receiving node. For example, the transmitting node may transmit a first coded version of information data to the receiving node. Upon receiving an NACK signal from the receiving node, the transmitting node may transmit a second coded version of the information data to the receiving node. The receiving node may combine the received first coded version and the received second coded version for error correction when both the received first coded version and the received second coded version are erroneous.

Transmission of data may be an autonomous (i.e., unscheduled) transmission or a scheduled transmission. As discussed above, the UE transmits the UCI 221 via a scheduled UL grant (e.g., transmission in PDCCH via DCI 220). Additionally, the UE receives the DL data signal 226 via a scheduled grant (e.g., transmission in PDCCH via DCI indicated in the DCI 224). A configured UL transmission is an unscheduled transmission, performed on the channel without a UL grant. A configured UL transmission may also be referred to as a grantless, grant-free, or autonomous transmission. In some examples, the UE may transmit a UL control information and/or UL data based on a configured grant. Additionally, configured-UL data may also be referred to as grantless UL data, grant-free UL data, unscheduled UL data, or autonomous UL (AUL) data. Additionally, a configured grant may also be referred to as a grant-free grant, unscheduled grant, or autonomous grant. The resources and other parameters used by the UE for a configured grant transmission may be provided by the BS in one or more of a RRC configuration or an activation DCI, without an explicit grant for each UE transmission.

To avoid collisions when communicating in a shared or an unlicensed spectrum, the UE may perform LBT to ensure that the shared channel is clear before transmitting a signal in the shared channel. In an example, if the channel is available (performance of the LBT results in a LBT pass), the UE may perform a UL transmission. If the channel is not available (performance of the LBT results in a LBT fail), the UE may back off and perform the LBT procedure again at a later point in time. Accordingly, based on the LBT, the UE may not be able to acquire a COT due to other nodes operating on the shared channel. The UE's ability to transmit on the UL transmission depends on whether the UE is able to gain access to the medium for transmission and/or reception of data. Rather than wait for a UL grant, the UE may desire to transmit a UL communication signal in a configured grant resource.

Additionally, to support more resource allocations in a network, transmissions may be scheduled based on a semi-persistent schedule (SPS). The BS may allocate one or more configured grant resources 234 in a frequency band (e.g., unlicensed frequency band or shared frequency band) for UL or DL transmission. In some examples, the configured grant resource 234 is based on a SPS. After a LBT results in a LBT pass, the BS may perform LBT and acquire a COT during which the BS transmits a SPS to a group of UEs. The BS may transmit to the UE, a configuration for a configured grant resource (e.g., configured grant resource 234). The BS may transmit the SPS, for example, via a RRC configuration message. The RRC configuration message may configure the UE with semi-persistent resources for AUL transmissions. In some examples, the UE-specific RRC signaling configures and/or reconfigures the location of the PUSCH for UCI transmission. The SPS includes a plurality of resource allocations spaced apart in time. The plurality of resource allocations may be spaced apart in time in accordance with a time interval of, for example, about 40 ms. In this example, the plurality of resources is allocated every 40 ms for each UE in the group of UEs. A resource may be shared with the group of UEs, and a UE may contend for the resource. The SPS may indicate scheduling information using relative timing (e.g., an offset time period relative to a current time period in which the scheduling information is communicated).

In some examples, the UE transmits a UL communication signal 230 in the configured grant resource 234, using a resource allocation specified in a SPS. The BS may receive the UL communication signal 230 in the configured grant resource 234. The UL communication signal 230 may include UL control information (UCI), a demodulation reference signal (DMRS), a phase-tracking reference signal (PTRS) (not shown), and UL data, which may also be referred to as configured-UL data. The UCI may include, for example, normal UCI and/or configured grant UCI (CG-UCI) 232. Although in FIG. 2, the ACK/NACK signal 228 and the CG-UCI 232 is shown as being separate from the UL communication signal 230, it should be understood that the ACK/NACK signal 228 and/or the CG-UCI 232 may be included in the UL communication signal 230.

The normal UCI may include a HARQ ACK/NACK signal, channel state information (CSI), and/or a scheduling request (SR). The HARQ ACK/NACK may also be referred to as a HARQ-ACK or an ACK/NACK (e.g., ACK/NAK signal 228). Additionally, the CSI may include a CSI-part 1 and a CSI-part 2. The CSI-part 1 can include information related to wideband channel quality indicator (CQI), sub-band differential CQI, and/or precoding matrix indicator (PMI), determined based on a reference signal (e.g., a CSI-RS) in a DL communication. The CSI-part 2 can include information related to CSI-RS resource indicator (CRI), rank indicator (RI), layer indicator (LI), determined based on a reference signal (e.g., a CSI-RS) in a DL communication. Each of the normal UCI (e.g. ACK/NACK, CSI-part1, CSI-part2) may be coded independently. The CG-UCI 232 is related to the configured grant and indicates information associated with the normal UCI (e.g., ACK/ NACK, the CSI, and the SR) and/or the configured-UL data (e.g., UL data signal 222).

The DMRS may include pilot symbols distributed across the frequency channel to enable the UE or the BS to perform channel estimation and demodulation for the decoding. The pilot symbols may be generated from a predetermined sequence with a certain pattern, and the remaining symbols may carry UL data. The system can beamform the DMRS, keep it within a scheduled resource, and/or transmit the DMRS only when necessary in either a DL or a UL channel. For example, the DMRS allows a receiver to determine a channel estimate for the frequency channel, where the channel estimate may be used to recover the UL data. Additionally, the PTRS tracks phase of the Local Oscillator at the transmitter and the receiver and accordingly, minimizes the effect of the oscillator phase noise on system performance.

Figure 3:
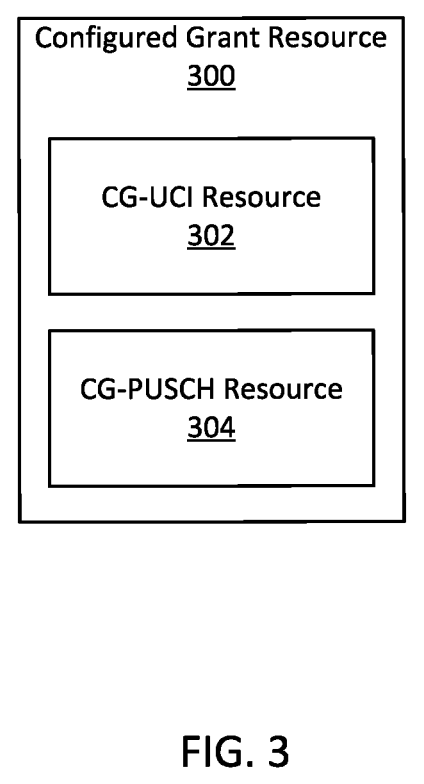

FIG. 3 illustrates a configured grant resource 300 according to one or more aspects of the present disclosure. The configured grant resource 300 may be communicated between a BS 105 and a UE 115 of the network 100 and may correspond to the configured grant resource 234 in FIG. 2. The configured grant resource 300 includes a configured grant UCI (CG-UCI) resource 302 and a configured grant PUSCH (CG-PUSCH) resource 304. Referring to the discussion related to FIG. 2, the UE may transmit at least some parts of the normal UCI and the CG-UCI 232 in the CG-UCI resource 302 may transmit the configured-UL data in the CG-PUSCH resource 304. For example, the UE may transmit a UL communication signal including the CG-UCI 232 multiplexed with at least some parts of the normal UCI and the configured-UL data.

Figure 4:
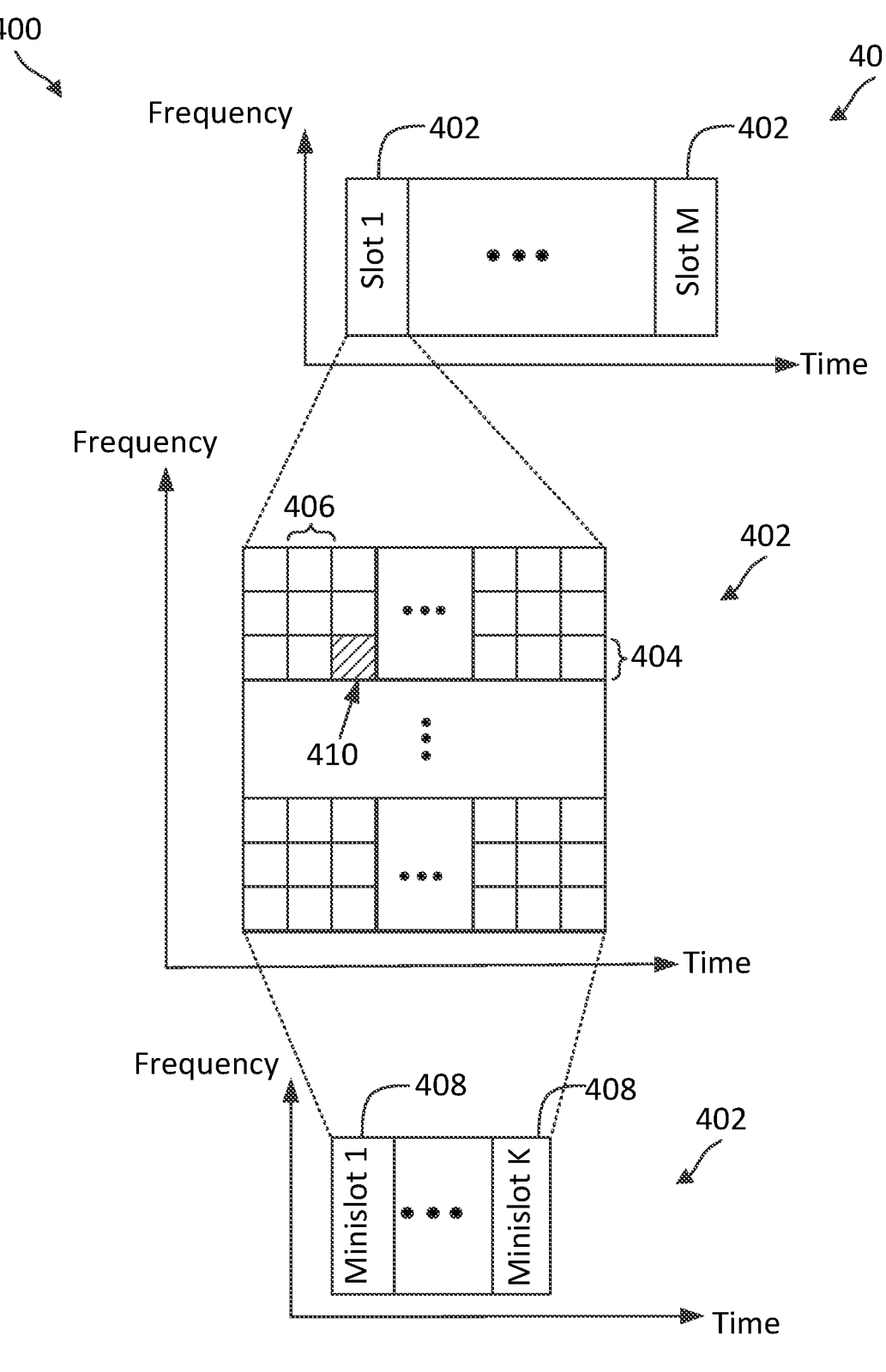
FIG. 4 is a timing diagram illustrating a transmission frame structure according to one or more aspects of the present disclosure.

The configured grant resource may be referred to as a time-frequency resource, which is explained in greater detail in FIG. 4. FIG. 4 is a timing diagram illustrating a transmission frame structure 400 according to one or more aspects of the present disclosure. The transmission frame structure 400 may be employed by BSs such as the BSs 105 and UEs such as the UEs 115 in a network such as the network 100 for communications. In particular, the BS may communicate with the UE using time-frequency resources configured as shown in the transmission frame structure 400. In FIG. 4, the x-axes represent time in some arbitrary units and the y-axes represent frequency in some arbitrary units. The transmission frame structure 400 includes a radio frame 401. The duration of the radio frame 401 may vary depending on the embodiments. In an example, the radio frame 401 may have a duration of about ten milliseconds. The radio frame 401 includes M number of slots 402, where M may be any suitable positive integer. In an example, M may be about 10.

Each slot 402 includes a number of subcarriers 404 in frequency and a number of symbols 406 in time. The number of subcarriers 404 and/or the number of symbols 406 in a slot 402 may vary depending on the embodiments, for example, based on the channel bandwidth, the subcarrier spacing (SCS), and/or the cyclic prefix (CP) mode. One subcarrier 404 in frequency and one symbol 406 in time forms one resource element (RE) 410 for transmission. Multiple REs 410 may be correspond to the configured grant resource 234 in FIG. 2.

A BS (e.g., BS 105 in FIG. 1) may schedule a UE (e.g., UE 115 in FIG. 1) for UL and/or DL communications at a time-granularity of slots 402 or mini-slots 408. Each slot 402 may be time-partitioned into K number of mini-slots 408. Each mini-slot 408 may include one or more symbols 406. The mini-slots 408 in a slot 402 may have variable lengths. For example, when a slot 402 includes N number of symbols 406, a mini-slot 408 may have a length between one symbol 406 and (N–1) symbols 406. In some embodiments, a mini-slot 408 may have a length of about two symbols 406, about four symbols 406, or about seven symbols 406. The BS may configure certain time-frequency resources (e.g., a set of REs 410) within a slot 402 for DL control channel monitoring and the resources may be repeated at some intervals (e.g., every 40 ms). The BS may indicate UL and/or DL scheduling grants in the DL control channel.

Referring back to FIG. 2, if the PUCCH transmission does not overlap in a time period with the configured grant resource 234, the UE may transmit the UCI 221 and the ACK/NACK 228 in the PUCCH. If the PUCCH transmission overlaps in a time period with the configured grant resource 234, however, the UE may determine whether to transmit a UL communication signal (e.g., CSI part 1, CSI part 2, ACK/NACK) in the PUCCH or the PUSCH and further determine the components to include in the UL communication signal. In FIG. 2, the PUCCH transmission overlaps in a time period with the configured grant resource 234. The present disclosure provides techniques for handling this overlap in time between the PUCCH transmission and the configured grant resource. In some aspects, the UE may transmit the UL communication signal 230 in PUSCH or the in the configured grant resource, the UL communication signal 230 including the CG-UCI 232 multiplexed along with at least parts of the UCI 221 and the configured-UL data. In some aspects, the UE may transmit the UCI 221 in PUCCH.

As discussed, the UCI 221 may include three UCI parts (e.g., CSI-part 1, CSI-part 2, and ACK/NACK). With the CG-UCI 232, the number of UCI parts may be four. The UE may have difficulty multiplexing more than three UCI parts. Additionally, with more UCI parts, the total number of REs occupied by the UCIs may increase. Accordingly, if the number of UCI parts for transmission exceeds a first threshold (e.g., three parts) or the total number of REs occupied by the UCIs exceeds a second threshold, the UE may determine, based on a set of priority rules, which UCI part(s) to remove and/or which UCI part(s) to include in the UL transmission. The UE may determine, based on the set of priority rules, whether to transmit the UL communication signal 230 in PUCCH or in PUSCH.

In some aspects, the UE may determine that a PUCCH transmission in a time period overlaps with a configured grant resource. The UE may desire to transmit a CG-PUSCH and associated CG-UCI. The PUCCH transmission may include first UCI including a first number of parts based on a set of priority rules. The UE may determine whether to transmit only the first UCI in a PUCCH resource associated with the PUCCH transmission or to remove at least one part included in the first number of parts and transmit the remaining parts of the first UCI multiplexed with the CG-PUSCH and associated CG-UCI in the configured grant resource. The UE may transmit a UL communication signal in accordance with the determination of whether to transmit the first UCI in the PUCCH resource or to remove at least one part included in the first number of parts and transmit the remaining parts with the CG-PUSCH and associated CG-UCI in the configured grant resource.

Figure 5:
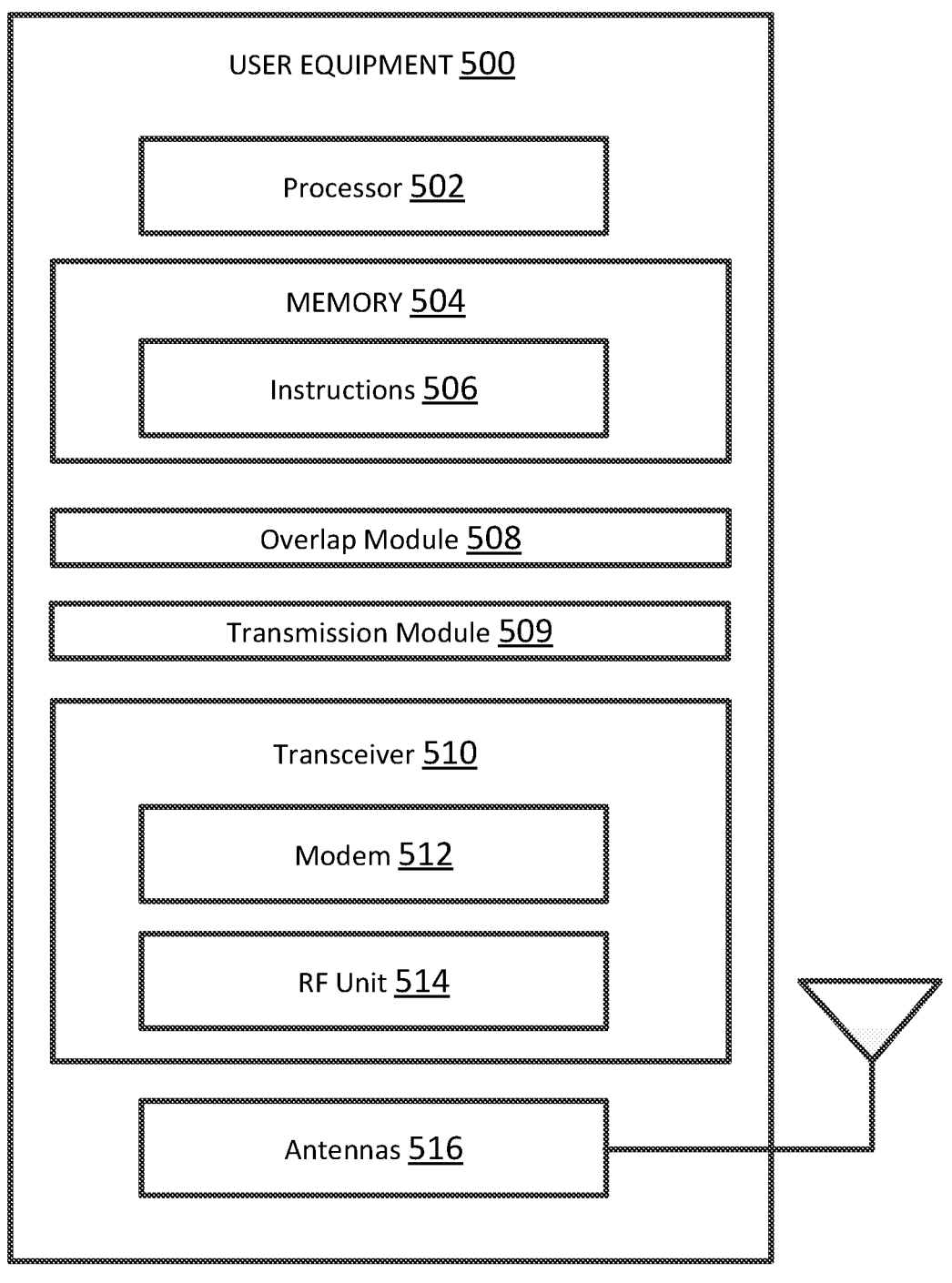
FIG. 5 is a block diagram of a user equipment (UE) according to one or more aspects of the present disclosure.

FIG. 5 is a block diagram of a UE 500 according to one or more aspects of the present disclosure. The UE 500 may be a UE 115 discussed above in FIG. 1. As shown, the UE 500 may include a processor 502, a memory 504, an overlap module 508, a transmission module 509, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 504 includes a non-transitory computer-readable medium. The memory 504 may store, or have recorded thereon, instructions 506. The instructions 506 may include instructions that, when executed by the processor 502, cause the processor 502 to perform the operations described herein with reference to the UEs 115 in connection with aspects of the present disclosure, for example, aspects of FIGS. 1-5 and 7-12. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The overlap module 508 and/or the transmission module 509 may be implemented via hardware, software, or combinations thereof. The overlap module 508 and/or the transmission module 509 may be implemented as a processor, circuit, and/or instructions 506 stored in the memory 504 and executed by the processor 502. In some instances, the overlap module 508 and/or the transmission module 509 can be integrated within the modem subsystem 512. The overlap module 508 and/or transmission module 509 can be implemented by a combination of software components (e.g., executed by a DSP or a general processor) and hardware components (e.g., logic gates and circuitry) within the modem subsystem 512. The overlap module 508 and/or the transmission module 509 may be used for various aspects of the present disclosure, for example, aspects of FIGS. 1-5 and 7-12.

In some aspects, the overlap module 508 may be configured to determine that a PUCCH transmission in a time period overlaps with a configured grant resource, the PUCCH transmission including first UCI including a first number of parts, the configured grant resource including a CG-UCI resource and a CG-PUSCH resource. The overlap module 508 may be configured to determine, based on a set of priority rules, whether to transmit the first UCI in the PUCCH transmission or to remove at least one part included in the first number of parts. The transmission module 509 may be configured to transmit an UL communication signal in accordance with the determining whether to transmit the first UCI in the PUCCH or to remove at least one part included in the first number of parts.

As shown, the transceiver 510 may include the modem subsystem 512 and the RF unit 514. The transceiver 510 can be configured to communicate bi-directionally with other devices, such as the BSs 105 or BS 600. The modem subsystem 512 may be configured to modulate and/or encode the data from the memory 504, the overlap module 508, and/or transmission module 509 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 115 to enable the UE 115 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices. The antennas 516 may provide the received data messages for processing and/or demodulation at the transceiver 510. The transceiver 510 may provide the demodulated and decoded data (e.g., configured grant resource, PUCCH transmission, first UCI, CG-UCI, CG-PUSCH) to the overlap module 508 and/or the transmission module 509 for processing. The antennas 516 may include multiple antennas of similar or different designs to sustain multiple transmission links. The RF unit 514 may configure the antennas 516.

The antenna(s) 516 may correspond to the antenna element(s) or port(s) discussed in the present disclosure. In some aspects, the transceiver 510 is configured to transmit an UL communication, by coordinating with the overlap module 508 and/or the transmission module 509. In some aspects, the UE 500 can include multiple transceivers 510 implementing different radio access technologies (RATs) (e.g., NR and LTE). In an aspect, the UE 500 can include a single transceiver 510 implementing multiple RATs (e.g., NR and LTE). In an aspect, the transceiver 510 can include various components, where different combinations of components can implement different RATs.

Figure 6:
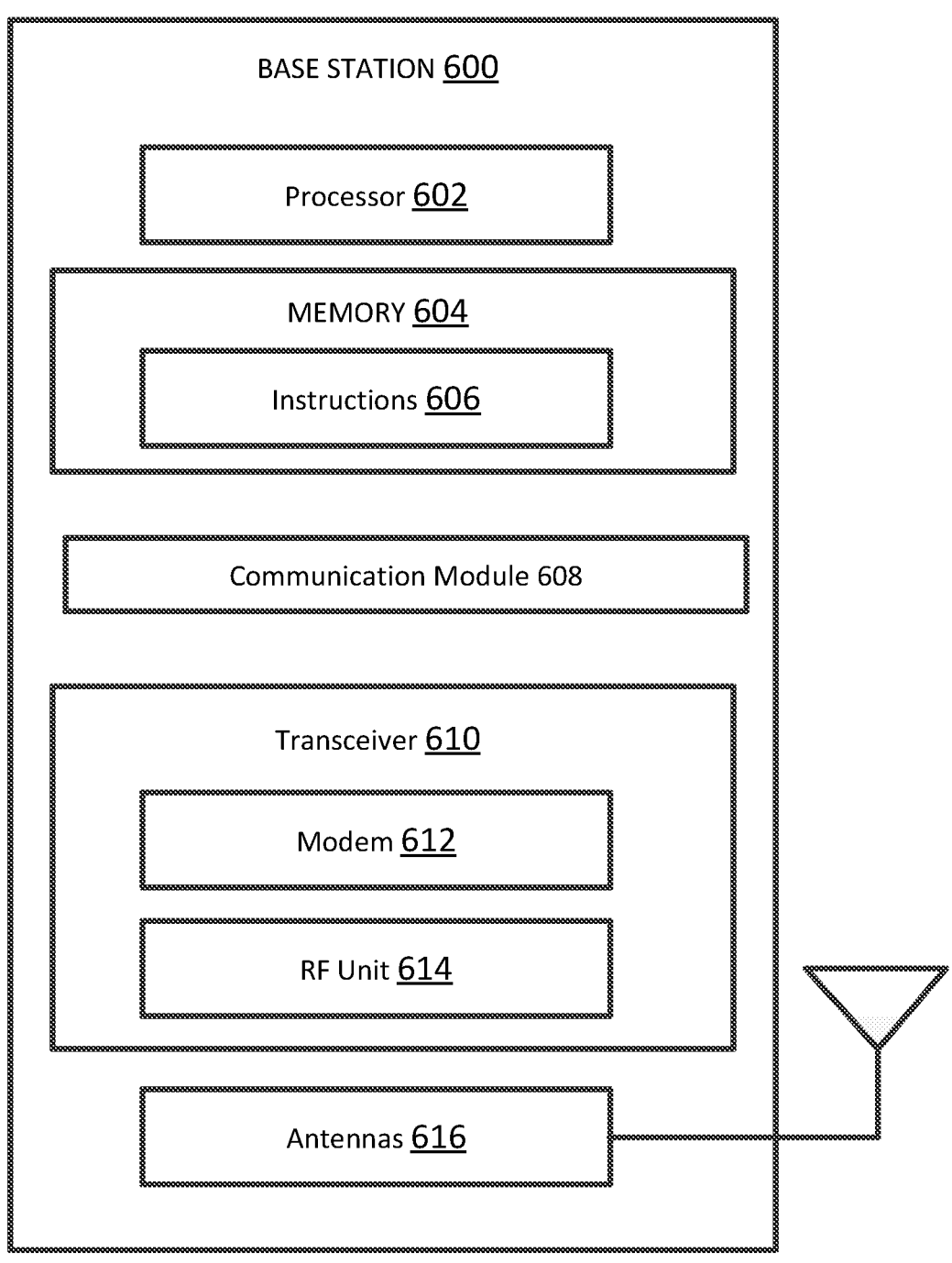
FIG. 6 is a block diagram of a base station (BS) according to one or more aspects of the present disclosure.

FIG. 6 is a block diagram of a BS 600 according to one or more aspects of the present disclosure. The BS 600 may be a BS 105 as discussed above in FIG. 1. As shown, the BS 600 may include a processor 602, a memory 604, a communication module 608, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 1-4 and 6-12. Instructions 606 may also be referred to as code, which may be interpreted broadly to include any type of computer-readable statement (s) as discussed above with respect to FIG. 5.

The communication module 608 may be implemented via hardware, software, or combinations thereof. The communication module 608 may be implemented as a processor, circuit, and/or instructions 606 stored in the memory 604 and executed by the processor 602. In some instances, the communication module 608 can be integrated within the modem subsystem 612. The communication module 608 can be implemented by a combination of software components (e.g., executed by a DSP or a general processor) and hardware components (e.g., logic gates and circuitry) within the modem subsystem 612. The communication module 608 may be used for various aspects of the present disclosure, for example, aspects of FIGS. 1-4 and 6-12.

In some aspects, the communication module 608 may be configured to allocate one or more configured grant resources in a frequency band (e.g., unlicensed frequency band or shared frequency band) for UL or DL transmission. In some aspects, the communication module 608 may be configured to transmit DCI indicating an UL grant or a DL grant to the UE. In some aspects, the communication module 608 may be configured to receive a UL communication (e.g., UL communication signal 230) in PUCCH or in a configured grant resource from the UE.

As shown, the transceiver 610 may include the modem subsystem 612 and the RF unit 614. The transceiver 610 can be configured to communicate bi-directionally with other devices, such as the UEs 115 and/or 500 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., grants, resource allocations) from the modem subsystem 612 (on outbound transmissions) or of transmissions originating from another source such as a UE 115 and/or UE 500. The RF unit 614 may be further configured to perform analog beamforming in conjunction with the digital beamforming. Although shown as integrated together in transceiver 610, the modem subsystem 612 and/or the RF unit 614 may be separate devices that are coupled together at the BS 105 to enable the BS 105 to communicate with other devices.

The RF unit 614 may provide the modulated and/or processed data, e.g. data packets (or, more generally, data messages that may contain one or more data packets and other information), to the antennas 616 for transmission to one or more other devices. This may include, for example, transmission of information to complete attachment to a network and communication with a camped UE 115 or 500 according to some aspects of the present disclosure. The antennas 616 may further receive data messages transmitted from other devices and provide the received data messages for processing and/or demodulation at the transceiver 610. The transceiver 610 may provide the demodulated and decoded data (e.g., UL communication signal) to the communication module 608 for processing. The antennas 616 may include multiple antennas of similar or different designs in order to sustain multiple transmission links.

In an example, the transceiver 610 is configured to receive an UL communication signal and transmit a DL communication signal, by coordinating with the communication module 608. In some aspects, the BS 600 can include multiple transceivers 610 implementing different RATs (e.g., NR and LTE). In an aspect, the BS 600 can include a single transceiver 610 implementing multiple RATs (e.g., NR and LTE). In an aspect, the transceiver 610 can include various components, where different combinations of components can implement different RATs FIG. 7 is a flow diagram of a communication method 700 according to one or more aspects of the present disclosure. Blocks of the method 700 can be executed by a computing device (e.g., a processor, processing circuit, and/or other suitable component) of a wireless communication device, such as the UEs 115 and 500. In some examples, UE 115 and the UE 500 may utilize one or more components, such as the processor 502, the memory 504, the overlap module 508, the transmission module 509, the transceiver 510, and/or the antennas 516 to execute the blocks of method 700. The method 700 may employ similar mechanisms as in the scheduling/configuration timeline 200 in FIG. 2, configured grant resource in FIG. 3, the transmission frame structure 400 in FIG. 4, the communication method 800 in FIG. 8, the communication method 900 in FIG. 9, the communication scheme 1000 in FIG. 10, the communication scheme 1100 in FIG. 11 and/or the communication method 1200 in FIG. 12.

At block 705, the method 700 includes determining, by a UE, that a PUCCH transmission in a time period overlaps with a configured grant resource, the PUCCH transmission including first UCI including a first number of parts, and the configured grant resource being associated with a CG-UCI and configured-UL data. The first UCI may include, for example, HARQ ACK/NACK, CSI-part 1, and/or CSI-part 2.

At block 710, the method 700 includes determining, by the UE, whether the first number exceeds a first threshold or whether a second number of resource elements (REs) occupied by the first UCI and the CG-UCI exceeds a second threshold. The second number can also be determined as the number of coded modulation symbols per layer occupied by the first UCI and the second UCI. The first threshold may be, for example, three UCI parts and correspond to a capability of the UE in multiplexing UCI parts. The second threshold may be, for example, a fraction of the total number of REs in the configured grant resource excluding the REs used to transmit reference signals (e.g. a DMRS), where the fraction may be configured by a higher layer radio resource configuration message. In some cases, the fraction may be equal to or less than one.

If the UE determines that the first number does not exceed the first threshold or that the second number of REs occupied by the first UCI and the CG-UCI does not exceed the second threshold, the method 700 proceeds to block 715. At block 715, the method 700 includes transmitting, by the UE, a first UL communication signal in the configured grant resource, the first UL communication signal including the CG-UCI multiplexed with the first UCI and the configured-UL data.

If the UE determines that the first number exceeds the first threshold or that the second number exceeds the second threshold, the method 700 proceeds to block 720. At block 720, the method 700 includes if the first UCI includes a CSI-part 2, removing, by the UE, the CSI-part 2 from the first UCI and updating, by the UE, the first and second numbers in accordance with the removal of the CSI-part 2. For example, if the UE removes the CSI-part 2, the first number will be reduced by one and the second number will be reduced by the number of REs occupied by the CSI-part 2.

At block 725, the method 700 includes determining, by the UE, whether the updated first number exceeds the first threshold or whether the updated second number exceeds the second threshold. If the UE determines that the updated first number does not exceed the first threshold and that the updated second number does not exceed the second threshold, the method 700 may proceed to the block 715. At this point, the UE may transmit a first UL communication signal in the configured grant resource, the first UL communication signal including the CG-UCI multiplexed with the first UCI and the configured-UL data, where the first UCI does not include the CSI-part 2. Additionally, the CG-UCI may include information on the first UCI. For example, the CG-UCI may specify which UCI parts are included in and/or which UCI parts are excluded from the first UL communication signal.

If the UE determines that the first number exceeds the first threshold or that the second number exceeds the second threshold, the method 700 proceeds to block 730. At block 730, the method 700 includes if the first UCI includes a CSI-part 1, removing, by the UE, the CSI-part 1 from the first UCI and updating, by the UE, the first and second numbers in accordance with the removal of the CSI-part 1. For example, if the UE removes the CSI-part 1, the first number will be reduced by one and the second number will be reduced by the number of REs occupied by the CSI-part 1.

At block 735, the method 700 includes determining, by the UE, whether the updated first number exceeds the first threshold or whether the updated second number exceeds the second threshold. If the UE determines that the updated first number does not exceed the first threshold and that the updated second number does not exceed the second threshold, the method 700 may proceed to the block 715. At this point, the UE may transmit a first UL communication signal in the configured grant resource, the first UL communication signal including the CG-UCI multiplexed with the first UCI and the configured-UL data, where the first UCI does not include the CSI-part 1. Additionally, the CG-UCI may include information on the first UCI. For example, the CG-UCI may specify which UCI parts are included in and/or excluded from the first UL communication signal.

If the UE determines that the first number exceeds the first threshold or that the second number exceeds the second threshold, the method 700 proceeds to block 740. At block 740, the method 700 includes determining, by the UE, to not transmit the CG-UCI and the configured-UL data in the configured grant resource. At block 745, the UE transmits a second UL communication signal in the PUCCH, the second UL communication signal including the first UCI including the original first number of parts. For example, the first UCI transmitted in the second UL communication signal is the original first UCI at block 705, without any of the parts of the first UCI having been removed for the UL transmission. If the UE executes the block 745, the UE may determine to not transmit a UL transmission using the configured grant resource.

As described above, the first UCI may initially include a number of parts, such as a CG-UCI, a CSI-part 1, a CSI-part 2, and/or a ACK/NACK (e.g., HARQ-ACK/NACK), and the method 700 may involve removing one or more of these parts based on the type of part itself. For instance, block 720 involves removing CSI-part 2, if present, and block 730 involves removing CSI-part 1, if present. In other words, the UE may determine to remove the configured-UL data or a part of the first UCI based on the types of parts included in the first UCI, in accordance with the method 700. As an illustrative example, if the first UCI includes a HARQ-ACK and the REs occupied by the HARQ-ACK, CG-UCI, and CG-PUSCH exceed the second threshold at block 735, the UE may determine to not transmit the CG-UCI and the configured-UL data at block 740, and the UE may determine to transmit the first UCI via the second communication signal in PUCCH at block 745. If the first UCI lacks a HARQ-ACK and the REs occupied by the first UCI, CG-UCI, and CG-PUSCH exceed the second threshold (e.g., at blocks 710, 725, and/or 735), the UE may determine to drop one or more parts of the first UCI, such as CSI-part 2 and/or CSI-part 1, to satisfy the threshold (e.g., at blocks 720 and/or 730) and may then transmit the first UCI via the first communication signal in the configured grant resource at block 715.

As illustrated, the method 700 includes a number of enumerated blocks, but aspects of the method 700 may include additional blocks before, after, and in between the enumerated blocks. In some aspects, one or more of the enumerated blocks may be omitted or performed in a different order. For example, although the block 720 is executed before the block 730, in other instances, the block 730 may be executed before the block 720. In another example, rather than execute the block 745, the UE may transmit a second UL communication signal using CG-PUSCH resources, the second UL communication signal including the first UCI including the original first number of parts.

In some aspects, the CSI-part 2 may include a plurality of subparts including a CSI-RS resource indicator (CRI), a rank indicator (RI), and/or layer indicator (LI). For example, the UE may remove subparts from the CSI-part 2 one-by-one rather than removing the CSI-part 2 as a whole. FIG. 8 is a flow diagram of a communication method 800 for removing subparts of the CSI-part 2 according to one or more aspects of the present disclosure. Blocks of the method 800 can be executed by a computing device (e.g., a processor, processing circuit, and/or other suitable component) of a wireless communication device, such as the UEs 115 and 500. In some examples, UE 115 and the UE 500 may utilize one or more components, such as the processor 502, the memory 504, the overlap module 508, the transmission module 509, the transceiver 510, and/or the antennas 516 to execute the blocks of method 800. The method 800 may employ similar mechanisms as in the scheduling/configuration timeline 200 in FIG. 2, configured grant resource in FIG. 3, the transmission frame structure 400 in FIG. 4, the communication method 700 in FIG. 7, the communication method 900 in FIG. 9, the communication scheme 1000 in FIG. 10, the communication scheme 1100 in FIG. 11 and/or the communication method 1200 in FIG. 12. As illustrated, the method 800 includes a number of enumerated blocks, but aspects of the method 800 may include additional blocks before, after, and in between the enumerated blocks. In some aspects, one or more of the enumerated blocks may be omitted or performed in a different order.

Blocks 805, 810, 815, and 820 in FIG. 8 correspond to block 720 in FIG. 7. For example, if the UE executes the block 720 in FIG. 7, the UE may proceed to block 805 in FIG. 8.

At block 805, the method 800 includes removing, by the UE, a first subpart of the CSI-part 2 from the first UCI. At block 810, the method 800 includes after the UE removes the first subpart from the CSI-part 2, updating, by the UE, the first and second numbers in accordance with the removal of the first subpart. For example, if the UE removes the first subpart, the second number will be reduced by the number of REs occupied by the first subpart. The first subpart may be, for example, a CRI, a RI, or a LI.

At block 815, the method 800 includes determining, by the UE, whether the updated first number exceeds the first threshold or whether the updated second number exceeds the second threshold. If the UE determines that the updated first number does not exceed the first threshold and that the updated second number does not exceed the second threshold, the method 800 proceeds to block 715 in FIG. 7. For example, the UE may leave the remaining subparts of the CSI-part 2 in the first UCI and proceed to block 715. At this point, the first UL communication signal in the configured grant resource may include the CG-UCI multiplexed with the first UCI and the configured-UL data, where the first UCI does not include any of the removed subparts of the CSI-part 2, but may include other subparts of the CSI-part 2. Additionally, the CG-UCI may include information on the first UCI. For example, the CG-UCI may specify which UCI parts and/or subparts are included in and/or excluded from the first UL communication signal.

If the UE determines that the updated first number exceeds the first threshold or that the updated second number exceeds the second threshold, the method 800 proceeds to block 820. At block, the method 800 includes determining, by the UE, whether the CSI-part 2 includes another subpart. If so, the method 800 proceeds to the block 805, in which the UE removes another subpart of the CSI-part 2 from the first UCI. If not, the method 800 proceeds to block 730 in FIG. 7.

In some aspects, the CSI-part 1 may include a plurality of subparts including a wideband channel quality indicator (CQI), subband differential CQI, and/or precoding matrix indicator (PMI). For example, the UE may remove subparts from the CSI-part 1 one-by-one rather than removing the CSI-part 1 as a whole. FIG. 9 is a flow diagram of a communication method 900 for removing subparts of the CSI-part 1 according to one or more aspects of the present disclosure. Blocks of the method 900 can be executed by a computing device (e.g., a processor, processing circuit, and/or other suitable component) of a wireless communication device, such as the UEs 115 and 500. In some examples, UE 115 and the UE 500 may utilize one or more components, such as the processor 502, the memory 504, the overlap module 508, the transmission module 509, the transceiver 510, and/or the antennas 516 to execute the blocks of method 900. The method 900 may employ similar mechanisms as in the scheduling/configuration timeline 200 in FIG. 2, configured grant resource in FIG. 3, the transmission frame structure 400 in FIG. 4, the communication method 700 in FIG. 7, the communication method 800 in FIG. 8, the communication scheme 1000 in FIG. 10, the communication scheme 1100 in FIG. 11 and/or the communication method 1200 in FIG. 12. As illustrated, the method 900 includes a number of enumerated blocks, but aspects of the method 900 may include additional blocks before, after, and in between the enumerated blocks. In some aspects, one or more of the enumerated blocks may be omitted or performed in a different order.

Blocks 905, 910, 915, and 920 in FIG. 9 correspond to block 730 in FIG. 7. For example, if the UE executes the block 730 in FIG. 7, the UE may proceed to block 905 in FIG. 9.

At block 905, the method 900 includes removing, by the UE, a second subpart of the CSI-part 1 from the first UCI. At block 910, the method 900 includes after the UE removes the second subpart of the CSI-part 1 from the first UCI, updating, by the UE, the first and second numbers in accordance with the removal of the second subpart. For example, if the UE removes the second subpart, the second number will be reduced by the number of REs occupied by the second subpart. The second subpart may be, for example, a wideband CQI, subband differential CQI, or a PMI.

At block 915, the method 900 includes determining, by the UE, whether the updated first number exceeds the first threshold or whether the updated second number exceeds the second threshold. If the UE determines that the updated first number does not exceed the first threshold and that the updated second number does not exceed the second threshold, the method 900 proceeds to block 715 in FIG. 7. For example, the UE may leave the remaining subparts of the CSI-part 1 in the first UCI and proceed to block 715. At this point, the first UL communication signal in the configured grant resource may include the CG-UCI multiplexed with the first UCI and the configured-UL data, where the first UCI does not include any of the removed subparts of the CSI-part 1, but may include other subparts of the CSI-part 1. Additionally, the CG-UCI may include information on the first UCI. For example, the CG-UCI may specify which UCI parts and/or subparts are included in and/or excluded from the first UL communication signal.

If the UE determines that the updated first number exceeds the first threshold or that the updated second number exceeds the second threshold, the method 900 proceeds to block 920. At block 920, the method 900 includes determining, by the UE, whether the CSI-part 1 includes another subpart. If so, the method 900 proceeds to the block 905, in which the UE removes another subpart of the CSI-part 1 from the first UCI. If not, the method 900 proceeds to block 740 in FIG. 7.

As illustrated and described above with reference to FIGS. 8 and 9, the UE may remove subparts from CSI-part 1 and/or CSI-part 2, which may include respective content (e.g., a CRI, a RI, a LI, a wideband CQI, a subband differential CQI, or a PMI). As further described portions of the methods 800 and 900 may correspond to portions of method 700 or FIG. 7, and each of the illustrated methods 800 and 900 involve determining whether to transmit the first UL communication signal in the configured grant resource based on the updated first and second numbers (e.g., at block 815 and block 915, respectively). Thus, the UE may determine to transmit or remove the configured-UL data or a part of the first UCI based on subparts (e.g., content) included in the first UCI, as described above.

Figure 10:
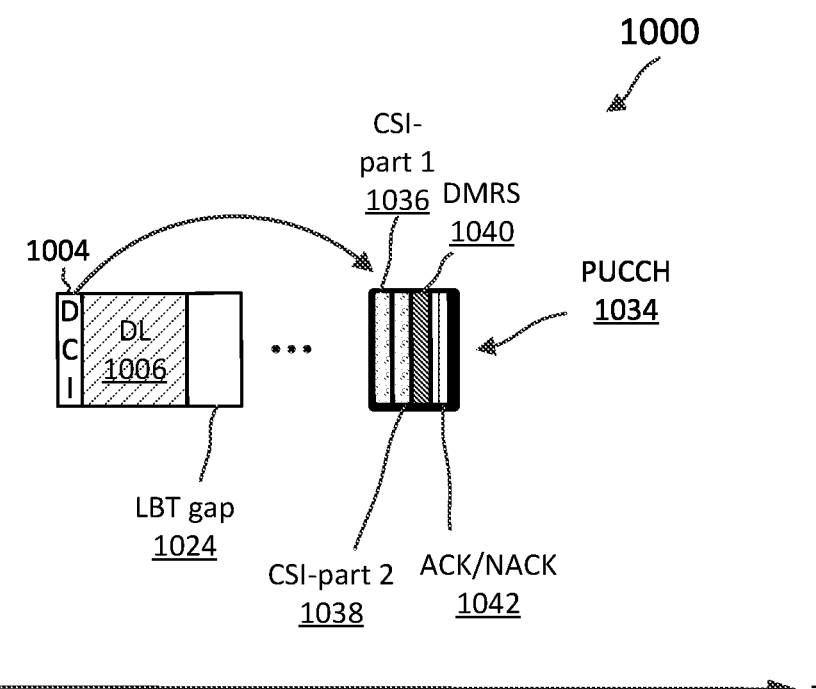
FIG. 10 illustrates a communication scheme for transmitting first uplink control information number (UCI) in physical uplink control channel (PUCCH) according to one or more aspects of the present disclosure.

FIG. 10 illustrates a communication scheme 1000 for transmitting first UCI in PUCCH according to one or more aspects of the present disclosure. The communication scheme 1000 may be employed by UEs such as the UEs 115 and/or BSs such as BSs 105 in a network such as the network 100. In FIG. 10, the x-axis represents time in some constant units.

In FIG. 10, the BS transmits DCI 1004 indicating a UL grant and a DL grant for the UE and transmits DL data 1006. The UE may monitor for DCI and receive and decode the DCI 1004. The UE receives the DL data 1006 based on the DL grant indicated in the DCI 1004 and is scheduled for a UL transmission indicated by a scheduled uplink (SUL) 1026. After completing the DL transmission (e.g., DL data 1006), the BS may monitor for a UL transmission. An LBT gap 1024 may be between an end of transmission of the DL data 1006 and a start of the SUL 1026. For example, the UE may perform an LBT during the LBT gap 1024 due to the link switching from DL to UL. The UE may transmit UCI and/or UL data via the SUL 1026 based on a successful LBT. The UE may transmit a UL communication signal in PUCCH 1034. UL communication signal may include a CSI-part 1 1036, a CSI-part 2 1038, a DMRS 1040, and an ACK/NACK 1042. The ACK/NACK 1042 may be feedback for the DL data 1006. In some aspects, the UE may transmit the UL communication signal in PUCCH 1034 in response to executing the block 745 in FIG. 7.

Figure 11:
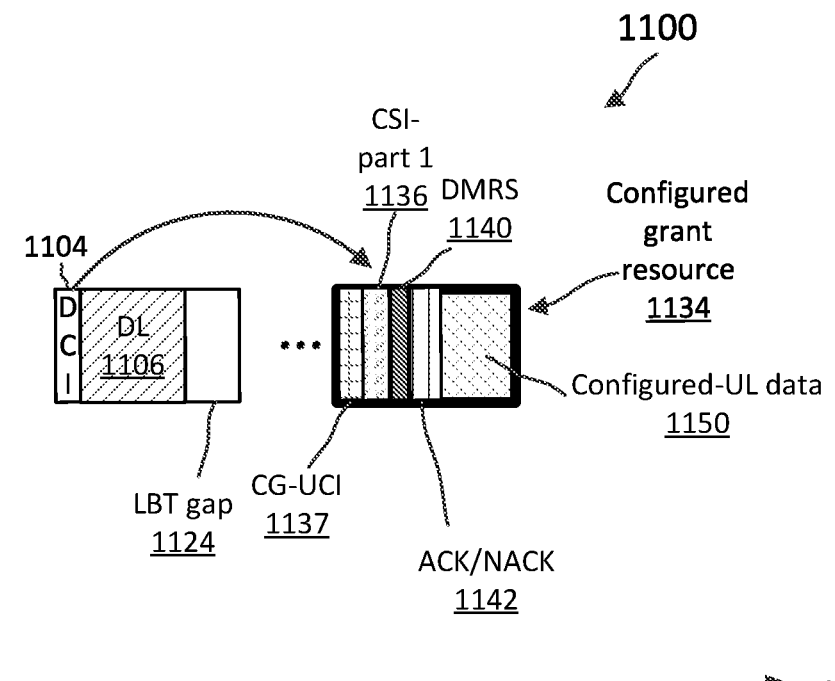
FIG. 11 illustrates a communication scheme for multiplexing configured grant UCI (CG-UCI) with first UCI and configured-uplink (UL) data in physical UL shared channel (PUSCH) according to one or more aspects of the present disclosure.

FIG. 11 illustrates a communication scheme 1100 for multiplexing CG-UCI with first UCI and configured-UL data in the configured grant resource according to one or more aspects of the present disclosure. The communication scheme 1100 may be employed by UEs such as the UEs 115 and/or BSs such as BSs 105 in a network such as the network 100. In FIG. 11, the x-axis represents time in some constant units.

In FIG. 11, the BS transmits DCI 1104 indicating a DL grant for the UE and transmits DL data 1106. The UE may monitor for DCI and receive and decode the DCI 1104. The UE receives the DL data 1106 based on the DL grant indicated in the DCI 1104. After completing the DL transmission (e.g., DL data 1106), the BS may monitor for a UL transmission.

The UE may receive a configuration for a configured grant resource from the BS. In an example, the UE receives a RRC configuration message with semi-persistent resources for one or more configured-grant UL resources. An LBT gap 1024 may be between an end of transmission of the DL data 1106 and a start of the configured grant resource 1134. For example, the UE may perform an LBT during the LBT gap 1124 due to the link switching from DL to UL. The UE may transmit UCI and/or UL data using the configured grant resource 1134. Based on a successful LBT, the UE may transmit a UL communication signal in the configured grant resource 1134, the UL communication signal including a CG-UCI 1137 multiplexed with first UCI and configured-UL data 1150. In some aspects, the UE may transmit the UL communication signal in the configured grant resource 1134 in response to executing the block 715 in FIG. 7. The first UCI may include, for example, at most two of a CSI-part 1, CSI-part 2, and an ACK/NACK. In some aspects, the UE may transmit the UL communication signal in PUCCH 1034 in response to executing the block 745 in FIG. 7. For example, the UE may remove the CSI-part 2 (as shown in block 720 in FIG. 2) and transmit a UL communication signal in the configured grant resource 1134, the UL communication signal including a CG-UCI 1137 multiplexed with CSI-part 1 1136, an ACK/NACK 1142, and configured-UL data 1150. In another example, the UE may remove the CSI-part 2 (as shown in block 720 in FIG. 2) and the CSI-part 1 (as show in block 730 in FIG. 2) and transmit a UL communication signal in the configured grant resource 1134, the UL communication signal including a CG-UCI 1037 multiplexed with the ACK/NACK 1142 and the configured-UL data 1150.

The set of priority rules for removing the configured-UL data or the first UCI discussed above are not intended to be a conclusive list of priority rules. In some aspects, the UE may apply additional or different priority rules from that discussed above (e.g., based on PUCCH format or CG-PUSCH traffic priority). Additionally, it should be understood that any of the priority rules discussed in the present disclosure may be used in combination with each other. In some aspects, if the PUCCH transmission in a time period overlaps with a configured grant resource, the UE may determine to remove the configured-UL data if a PUCCH format implements a multiplexing format with other UEs. In this example, the UE may determine to not transmit the configured-UL data so that other UEs transmitting PUCCH will not be blocked. In another example, aperiodic CSI may have a higher priority than periodic CSI. Aperiodic CSI may have a higher priority than periodic CSI because the aperiodic CSI is dynamically triggered. In this example, if the PUCCH transmission in a time period overlaps with a configured grant resource and the number of UCIs (e.g., CG-UCI, CSI-part 1, CSI-part 2, and/or ACK/NACK) exceeds three, the UE may determine to remove the CSI-part 2 if the CSI is periodic and may determine to remove the configured-UL data if the CSI is aperiodic. In this way, the UE may determine whether to transmit the first UCI in a PUCCH resource or to remove a part included in the first UCI based on determining whether the first UCI is associated with an aperiodic trigger (e.g., a dynamic trigger). In another example, if the PUCCH transmission in a time period overlaps with a configured grant resource and the number of UCIs (e.g., CG-UCI, CSI-part 1, CSI-part 2, and/or ACK/NACK) exceeds three, the UE may determine to remove CSI-part 2 or the configured-UL data depending on whether the CSI included in the first UCI is CSI-part 1 or CSI-part 2. In other words, the UE may determine whether to transmit the first UCI in a PUCCH resource or to remove a part included in the first UCI based on the type of parts included in the first UCI. In another example, if the PUCCH transmission in a time period overlaps with a configured grant resource and the number of UCIs (e.g., CG-UCI, CSI-part 1, CSI-part 2, and/or ACK/NACK) exceeds three, the UE may determine to remove the configured-UL data or parts of the first UCI (e.g. CSI-part 2) based on a traffic priority of PUSCH. For example, if PUSCH has high priority traffic (e.g., URLLC), the UE may determine to remove the CSI-part 2. If PUSCH does not have high priority traffic, the UE may determine to remove the configured-UL data.

As discussed, the first UCI and the CG-UCI may occupy a second number of REs. Additionally, the UE may determine whether the second number of REs occupied by the first UCI and the CG-UCI exceeds a second threshold. If the second number exceeds the second threshold, the UE may perform one or more actions (e.g., block 720 or block 730 in FIG. 7, block 805 and block 810 in FIG. 8, or block 905 and block 910 in FIG. 9) to reduce the number of REs occupied by the first UCI and the CG-UCI. The UE may determine whether the second number exceeds the second threshold using a variety of techniques.

In some aspects, the UE determines whether a total number of REs occupied by the first UCI and the CG-UCI is greater than a configured scale multiplied by a total number of REs available for PUSCH/UCI transmission in all the symbols of the PUSCH. The total number of REs occupied by the first UCI and the CG-UCI may also be referred to as the number of coded modulation symbols per layer for the transmission of the UCIs (the first UCI and the CG-UCI). The UE may apply the following equation (1):

$$O'_{ACK+CG-UCI} + O'_{CSI-part1} + O'_{CSI-part2} > \qquad \text{equation (1).}$$
$$\alpha \sum\nolimits_{l=l_0}^{N^{PUSCH}_{symb,all}-1} M^{UCI}_{sc}(l),$$

where the left-hand side of the equation represents the total number of REs occupied by the first UCI and the CG-UCI (or the number of coded modulation symbols per layer for the transmission of the first UCI and the CG-UCI, and the right-hand side of the equation represents the second threshold. The UE adjusts the second number of REs on the left-hand side until the second number is less than the second threshold. For example, the UE may continually remove parts of the first UCI (e.g., CSI-part 1 or CSI-part 2 or any of their subparts) to reduce the second number of REs occupied by the first UCI and the CG-UCI until the second number does not exceed the second threshold.

On the left-hand side of equation (1), the $O'_{ACK+CG-UCI}$ may represent the number of REs occupied by the HARQ ACK/NACK and the CG-UCI, the $O'_{CSI-part\ 1}$ may represent the number of REs occupied by the CSI-part 1, and the $O'_{CSI-part\ 2}$ may represent the number of REs occupied by the CSI-part 2.

On the right-hand side of equation, a is configured by a higher layer parameter called scaling and is a number that is less than one. Additionally, $$\sum_{l=l_0}^{N_{symb,all}^{PUSCH}-1}$$

represents the sum of the total number of REs available in the PUSCH (e.g., across all the symbols of the PUSCH) for the UCI transmission not including the REs containing reference signals (e.g., DMRS). For example, the sum starts from $l_0$, which represents the first non-DMRS symbol. If the symbol is DMRS, then no REs for that symbol are available. The UE may accumulate the number of REs occupied by each symbol starting from $l_0$ over all the symbols of the PUSCH. Additionally, $$M_{sc}^{UCI}(l)$$

represents the number of subcarriers for the UCI transmission (e.g., transmission of the first UCI and the CG-UCI).

In some aspects, the UE may map the UCIs (first UCI and CG-UCI) to the configured grant resource, and determine whether a code rate for the CG-PUSCH for a given MCS (ModIn order and transport block (TB) size) with the remaining REs exceeds the second threshold. The UE may determine the second threshold in this case as the code rate that requires T dB higher SNR (e.g., 3 dB) for the same performance (as for the original lower code rate when there is no first UCI to multiplex), where T is a number greater than zero. As the number of REs occupied by the first UCI increases, the number of REs available for the CG-PUSCH is reduced, causing an increase in the code rate for rate matching and hence degrading the performance or requiring a higher SNR for the same performance. Thus, by limiting the code rate to not go beyond the second threshold, the UE may reduce performance degradation of the CG-PUSCH performance by multiplexing the first number of parts of the first UCI.

FIG. 12 is a flow diagram of a communication method 1200 according to one or more aspects of the present disclosure. Aspects of the method 1200 can be executed by a wireless communication device, such as the UEs 115 and/or 500 utilizing one or more components, such as the processor 502, the memory 504, the overlap module 508, the transmission module 509, the transceiver 510, the modem 512, the one or more antennas 516, and various combinations thereof. As illustrated, the method 1200 includes a number of enumerated blocks, but the method 1200 may include additional blocks before, after, and in between the enumerated blocks. For example, in some instances one or more aspects of methods 700, 800, and/or 900 may be implemented as part of method 1200. In some instances, one or more of the enumerated blocks may be omitted or performed in a different order.

At block 1210, the method 1200 includes determining, by a UE, that a PUCCH transmission in a time period overlaps with a configured grant resource, the PUCCH transmission including first UCI including a first number of parts, and the configured grant resource including a CG-UCI resource and a CG-PUSCH resource. The UE may desire to transmit a CG-PUSCH and associated CG-UCI.

At block 1220, the method 1200 includes determining, by the UE, whether to transmit the first UCI in a PUCCH resource associated with the PUCCH transmission or to remove at least one part included in the first number of parts based on a set of priority rules. In some aspects, the UE may determine whether to transmit only the first UCI in a PUCCH resource or to remove at least one part included in the first number of parts and transmit the remaining parts of the first UCI multiplexed with the CG-PUSCH and associated CG-UCI in the configured grant resource. The UE may remove at least one part included in the first number of parts based on a set of priority rules by, for example, removing the CSI-part 2 and the CSI-part 1 in that order.

At block 1230, the method 1200 includes transmitting, by the UE, a UL communication signal in accordance with the determining whether to transmit the first UCI in the PUCCH resource or to remove at least one part included in the first number of parts. In some aspects, the UE may transmit a UL communication signal in accordance with the determination of whether to transmit the first UCI in the PUCCH resource or to remove at least one part included in the first number of parts and transmit the remaining parts with the CG-PUSCH and associated CG-UCI in the configured grant resource.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

Implementation examples are described in the following numbered clauses:

1. A method of wireless communication, comprising:
   determining, by a user equipment (UE), that a physical uplink control channel (PUCCH) transmission in a time period overlaps with a configured grant resource, the PUCCH transmission including first UL control information (UCI) including a first number of parts, and the configured grant resource including a configured grant UCI (CG-UCI) resource and a configured grant physical uplink shared channel (CG-PUSCH) resource;
   determining, by the UE, whether to transmit the first UCI in a PUCCH resource associated with the PUCCH transmission or to remove at least one part included in the first number of parts based on a set of priority rules; and
   transmitting, by the UE, an uplink (UL) communication signal in accordance with the determining whether to transmit the first UCI in the PUCCH resource or to remove at least one part included in the first number of parts.

2. The method of clause 1, comprising:
   determining, by the UE, whether the first number of parts exceeds a first threshold and whether a second number of resource elements (REs) occupied by the first UCI and CG-UCI exceeds a second threshold.

3. The method of clause 2, wherein determining to remove is in response to a
   determination of whether the first number of parts exceeds the first threshold and
   whether the second number of REs exceeds the second threshold.

4. The method of clause 2, wherein the first threshold is two.

5. The method of clause 2, comprising:
   determining a set of symbols of the configured grant resource that do not contain a reference signal, the second threshold being a product of a third number and a total number of REs across the set of symbols, and the third number being less than one.

6. The method of any of clauses 1-5, comprising:
   removing at least one part included in the first number of parts in response to a determination to remove; and
   transmitting, by the UE in the configured grant resource, a remaining number of parts included in the first UCI, a CG-UCI, and a CG-PUSCH after the removing.

7. The method of any of clauses 1-5, wherein transmitting the UL communication signal includes transmitting, by the UE in the PUCCH resource, the UL communication signal including the first UCI in response to a determination to transmit the first UCI in the PUCCH resource.

8. The method of any of clauses 1-5, wherein transmitting the UL communication signal includes transmitting, by the UE in the configured grant resource, the UL communication signal including a CG-UCI multiplexed with a subset of the first number of parts and a CG-PUSCH in response to a determination to remove at least one part included in the first number of parts.

9. The method of any of clauses 1-8, wherein the first number is three, and the first UCI includes a channel state information (CSI)-part 1, a CSI-part 2, and a hybrid automatic repeat request acknowledgement (HARQ-ACK).

10. The method of clause 9, comprising:
    removing, by the UE, the CSI-part 2 from the first UCI;
    updating, by the UE, a second number of REs occupied by the first UCI and a CG-UCI in accordance with removal of the CSI-part 2;
    updating, by the UE, the first number in accordance with removal of the CSI-part 2; and
    determining, by the UE, whether the updated first number exceeds a first threshold and whether the updated second number a second threshold, wherein transmitting the UL communication signal includes transmitting the UL communication signal in the configured grant resource in response to the determination that the updated first number does not exceed the first threshold and that the updated second number does not exceed the second threshold, the UL communication signal including CG-UCI multiplexed with the CSI-part 1, the HARQ-ACK, and a CG-PUSCH.

11. The method of clause 10, wherein after removing the CSI-part 2 from the first UCI, the first number is two, and the first UCI includes the CSI-part 1 and the HARQ-ACK.

12. The method of clause 11, comprising:
    removing, by the UE, the CSI-part 1 from the first UCI;
    updating, by the UE, the second number of REs occupied by the first UCI and the CG-UCI in accordance with removal of the CSI-part 1;
    updating, by the UE, the first number of parts in accordance with removal of the CSI-part 1; and
    determining, by the UE, whether the updated first number exceeds the first threshold and whether the updated second number exceeds the second threshold, wherein transmitting the UL communication signal includes transmitting the UL communication signal in the configured grant resource in response to the determination that the updated first number does not exceed the first threshold and that the updated second number does not exceed the second threshold, the UL communication signal including CG-UCI multiplexed with the HARQ-ACK and the CG-PUSCH.

13. The method of clause 12, wherein the first UCI includes the HARQ-ACK, the method comprising:
    determining that the updated second number occupied by the first UCI and CG-UCI exceeds the second threshold, wherein transmitting the UL communication signal includes transmitting the UL communication signal in the PUCCH resource in response to a determination that the updated second number exceeds the second threshold.

14. The method of clause 1, comprising:
   determining that the first number of parts exceeds a first threshold; and
   determining whether a second number of REs occupied by the first UCI and a CG-UCI exceeds a second threshold, wherein determining to transmit includes determining whether to transmit in response to a determination that the first number of parts exceeds the first threshold or a determination that the second number exceeds the second threshold.

15. The method of any of clauses 1-5, 9, or 14, wherein transmitting the UL communication signal includes transmitting the first UCI in the configured grant resource.

16. The method of any of clauses 1-6, 8-12, 14, or 15, wherein determining whether to transmit includes determining whether to transmit the first UCI in the CG-PUSCH resource, and wherein transmitting the UL communication signal includes transmitting the UL communication signal in accordance with a determination to transmit the first UCI in the configured grant resource.

17. The method of any of clauses 1 or 9, comprising:
   determining whether the first number of parts exceeds a first threshold; and
   determining to remove at least one part included in the first number of parts in response to a determination that the first number of parts exceeds the first threshold, wherein transmitting the UL communication signal includes transmitting the UL communication signal in the configured grant resource.

18. The method of any of clauses 1 or 7, wherein the first UCI includes a HARQ-ACK, and the first number is one, the method comprising:
   determining that a second number of REs occupied by the first UCI and CG-UCI exceeds a second threshold, wherein transmitting the UL communication signal includes transmitting the UL communication signal in the PUCCH resource in response to a determination that the second number exceeds the second threshold.

19. The method of any of clauses 1-18, further comprising:
   identifying one or more parts included in the first number of parts; and
   wherein the determining whether to transmit includes determining whether to transmit further based on the identified one or more parts.

20. The method of any of clauses 1-19, wherein determining whether to transmit includes determining whether the first UCI is associated with an aperiodic trigger.

21. The method of any of clauses 1-20, further comprising:
   identifying one or more subparts corresponding to the first number of parts; and
   wherein the determining whether to transmit includes determining whether to transmit further based on the identified one or more subparts.

22. An apparatus, comprising:
   a processor configured to:
      determine, by a user equipment (UE), that a physical uplink control channel (PUCCH) transmission in a time period overlaps with a configured grant resource, the PUCCH transmission including first UL control information (UCI) including a first number of parts, and the configured grant resource including a configured grant UCI (CG-UCI) resource and a configured grant physical uplink shared channel (CG-PUSCH) resource; and
      determine, by the UE, whether to transmit the first UCI in a PUCCH resource associated with the PUCCH transmission or to remove at least one part included in the first number of parts based on a set of priority rules; and
   a transceiver configured to:
      transmit, by the UE, an uplink (UL) communication signal in accordance with the determining whether to transmit the first UCI in the PUCCH resource or to remove at least one part included in the first number of parts.

23. The apparatus of clause 22,
   wherein the processor is configured to determine, by the UE, whether the first number of parts exceeds a first threshold and whether a second number of resource elements (REs) occupied by the first UCI and CG-UCI exceeds a second threshold.

24. The apparatus of clause 23, wherein the processor is configured to remove at least one part included in the first number of parts in response to a determination of whether the first number of parts exceeds the first threshold and whether the second number of REs exceeds the second threshold.

25. The apparatus of clause 23, wherein the first threshold is two.

26. The apparatus of any of clauses 22 or 23,
   wherein the processor is configured to remove at least one part included in the first number of parts in response to a determination to remove; and
   wherein the transceiver is configured to transmit, by the UE, a remaining number of parts included in the first UCI, a CG-UCI, and a CG-PUSCH in the configured grant resource after the removing.

27. The apparatus of clause 22, wherein the first UCI includes a hybrid automatic repeat request acknowledgement (HARQ-ACK), and the first number is one, and
   wherein the processor is configured to determine that a second number of REs occupied by the first UCI and CG-UCI exceeds a second threshold, and
   wherein the transceiver is configured to transmit the UL communication signal in the PUCCH resource in response to a determination that the second number of REs exceeds the second threshold.

28. A computer-readable medium having program code recorded thereon, the program code comprising:
   code for causing a user equipment (UE) to determine that a physical uplink control channel (PUCCH) transmission in a time period overlaps with a configured grant resource, the PUCCH transmission including first UL control information (UCI) including a first number of parts, and the configured grant resource including a configured grant UCI (CG-UCI) resource and a configured grant physical uplink shared channel (CG-PUSCH) resource;
   code for causing the UE to determine whether to transmit the first UCI in a PUCCH resource associated with the PUCCH transmission or to remove at least one part included in the first number of parts based on a set of priority rules; and
   code for causing the UE to transmit an uplink (UL) communication signal in accordance with the determining whether to transmit the first UCI in the PUCCH resource or to remove at least one part included in the first number of parts.

29. The computer-readable medium of clause 28, wherein the code for causing the UE to transmit the UL communication signal includes code for causing the UE to transmit the UL communication signal in the PUCCH resource, and wherein the UL communication signal includes the first UCI.

30. The computer-readable medium of clause 28, wherein the code for causing the UE to transmit the UL communication signal includes code for causing the UE to transmit the UL communication signal in the configured grant resource, and wherein the UL communication signal includes a CG-UCI multiplexed with a subset of the first number of parts and a CG-PUSCH.

31. The computer-readable medium of any of clauses 28-30, wherein the first number is three, and the first UCI includes a channel state information (CSI)-part 1, a CSI-part 2, and a hybrid automatic repeat request acknowledgement (HARQ-ACK).

32. The computer-readable medium of clause 31, comprising:
code for causing the UE to remove the CSI-part 2 from the first UCI;
code for causing the UE to update a second number of REs occupied by the first UCI and a CG-UCI and to update the first number in accordance with removal of the CSI-part 2; and
code for causing the UE to determine whether the updated first number exceeds a first threshold and whether the updated second number exceeds a second threshold.

33. The computer-readable medium of clause 32, wherein the code for causing the UE to transmit the UL communication signal includes code for causing the UE to transmit the UL communication signal in the configured grant resource in response to a determination that the updated first number does not exceed the first threshold and that the updated second number does not exceed the second threshold, wherein the UL communication signal includes the CG-UCI multiplexed with the CSI-part 1, the HARQ-ACK, and the CG-PUSCH.

34. The computer-readable medium of clause 32, comprising:
code for causing the UE to determine a set of symbols of the configured grant resource that do not contain a reference signal, wherein the second threshold is a product of a third number and a total number of REs across the set of symbols, and the third number is less than one.

35. The computer-readable medium of clause 33, wherein after the code for causing the UE to remove the CSI-part 2 from the first UCI is executed, the first number is two, and the first UCI includes the CSI-part 1 and the HARQ-ACK.

36. The computer-readable medium of clause 32, comprising:
code for causing the UE to remove the CSI-part 1 from the first UCI;
code for causing the UE to update the first number and the second number in accordance with removal of the CSI-part 1; and
code for causing the UE to determine whether the updated first number exceeds the first threshold and whether the updated second number exceeds the second threshold, wherein the code for causing the UE the transmit the UL communication signal includes code for causing the UE to transmit the UL communication signal in the configured grant resource in response to the determination that the updated first number does not exceed the first threshold and that the updated second number does not exceed the second threshold, and wherein the UL communication signal includes the CG-UCI multiplexed with the HARQ-ACK and the CG-PUSCH.

37. The computer-readable medium of clauses 28 or 29, comprising:
code for causing the UE to determine that a second number of REs occupied by the first UCI and CG-UCI exceeds a second threshold, wherein the first UCI includes a HARQ-ACK, and the first number is one; and
code for causing the UE to transmit the UL communication signal in the PUCCH resource in response to a determination that the second number of REs exceeds the second threshold.

38. An apparatus, comprising:
means for determining, that a physical uplink control channel (PUCCH) transmission in a time period overlaps with a configured grant resource, the PUCCH transmission including first UL control information (UCI) including a first number of parts, and the configured grant resource including a configured grant UCI (CG-UCI) resource and a configured grant physical uplink shared channel (CG-PUSCH) resource;
means for determining whether to transmit the first UCI in a PUCCH resource associated with the PUCCH transmission or to remove at least one part included in the first number of parts based on a set of priority rules; and
means for transmitting an uplink (UL) communication signal in accordance with the determining whether to transmit the first UCI in the PUCCH resource or to remove at least one part included in the first number of parts.

39. The apparatus of clause 38, comprising:
means for determining whether the first number of parts exceeds a first threshold; and
means for determining whether a second number of REs occupied by the first UCI and CG-UCI exceeds a second threshold, wherein determining to transmit includes determining whether to transmit in response to a determination that the first number of parts exceeds the first threshold or a determination that the second number exceeds the second threshold.

40. The apparatus of clause 38, comprising:
means for determining that a second number of REs occupied by the first UCI and a CG-UCI exceeds a second threshold, wherein the first UCI includes a hybrid automatic repeat request acknowledgement (HARQ-ACK), and the first number is one, and
wherein the means for transmitting the UL communication signal includes means for transmitting the UL communication signal in the PUCCH resource in response to a determination that the second number of REs exceeds the second threshold.

What is claimed is:
1. A method of wireless communication performed by a user equipment (UE), comprising:
determining that a physical uplink control channel (PUCCH) transmission in a time period overlaps with a configured grant resource, the PUCCH transmission including first uplink control information (UCI) including a first number of parts comprising at least one of a channel state information (CSI)-part 1 (CSI-part 1), a CSI-part 2, an acknowledgement (ACK), or a hybrid automatic repeat request acknowledgement (HARQ-ACK), and the configured grant resource including a configured grant UCI (CG-UCI) resource and a configured grant physical uplink shared channel (CG-PUSCH) resource;

determining whether a first number of resource elements (REs) occupied by the first UCI and a CG-UCI exceeds a first threshold, wherein the first threshold is based on a number of REs of the configured grant resource excluding REs associated with transmitting a reference signal;

determining, based at least in part on determining whether the first number of REs exceeds the first threshold and further based at least in part on a set of priority rules, whether to;

transmit the first UCI in a PUCCH resource associated with the PUCCH transmission, transmit the first UCI in the CG-PUSCH resource, or remove at least one part included in the first number of parts; and transmitting an uplink (UL) communication in accordance with determining whether to transmit or to remove.

2. The method of claim 1, further comprising:

determining whether the first number of parts exceeds a second threshold, wherein determining to remove is based at least in part on determining whether the first number of parts exceeds the second threshold.

3. The method of claim 2, wherein the other second threshold is two.

4. The method of claim 1, further comprising:

determining the first threshold as a product of:

a scaling factor that is less than one, and a total number of REs associated with a number of symbols of the configured grant resource that excludes REs used for transmitting the reference signal.

5. The method of claim 1, further comprising:

removing, based at least in part on determining to remove, the at least one part included in the first number of parts, wherein transmitting the UL communication comprises transmitting, based at least in part on removing the at least one part and in the configured grant resource, a CG-PUSCH carrying a remaining number of parts included in the first UCI and the CG-UCI.

6. The method of claim 1, wherein transmitting the UL communication comprises transmitting, based at least in part on determining to transmit the first UCI in the PUCCH resource the first UCI in the PUCCH resource.

7. The method of claim 1, wherein transmitting the UL communication comprises transmitting, based at least in part on determining to remove and in the configured grant resource, the CG-UCI multiplexed with a subset of the first number of parts and a CG-PUSCH.

8. The method of claim 1, wherein the first number of parts is three, and the first UCI includes the CSI-part 1, the CSI-part 2, and the HARQ-ACK.

9. The method of claim 8, further comprising:

removing the CSI-part 2 from the first UCI;

updating the first number of REs based at least in part on removing the CSI-part 2 to obtain an updated first number of REs;

updating the first number of parts based at least in part on removing the CSI-part 2 to obtain an updated first number of parts; and determining whether the updated first number of parts exceeds a second threshold and whether the updated first number of REs exceeds the first threshold, wherein transmitting the UL communication comprises selectively transmitting the UL communication in the configured grant resource based at least in part on determining whether the updated first number of parts exceeds the second threshold and the updated first number of REs exceeds the first threshold, the UL communication including the CG-UCI multiplexed with the CSI-part 1, the HARQ-ACK, and a CG-PUSCH.

10. The method of claim 9, wherein the updated first number of parts is two, and wherein the first UCI includes the CSI-part 1 and the HARQ-ACK.

11. The method of claim 10, further comprising:

removing the CSI-part 1 from the first UCI;

updating the updated first number of REs based at least in part on removing the CSI-part 1 to obtain a further updated first number of REs;

updating the updated first number of parts based at least in part on removing the CSI-part 1 to obtain a further updated first number of parts; and determining whether the further updated first number of parts exceeds the second threshold and whether the further updated first number of REs exceeds the first threshold, wherein transmitting the UL communication comprises selectively transmitting the UL communication in the configured grant resource or the PUCCH resource based at least in part on determining whether the further updated first number of parts exceeds the second threshold and whether the further updated number of REs exceeds the first threshold, the UL communication including the CG-UCI multiplexed with the HARQ-ACK and a CG-PUSCH.

12. The method of claim 11, wherein selectively transmitting the UL communication comprises:

transmitting the UL communication in the PUCCH resource based at least in part on determining that the further updated first number of parts exceeds the second threshold or that the further updated first number of REs exceeds the first threshold.

13. The method of claim 1, further comprising:

determining whether the first number of REs exceeds the first threshold, wherein determining whether to transmit or to remove comprises determining whether to transmit the first UCI in the PUCCH resource or the CG-PUSCH resource further based at least in part on determining that the first number of parts exceeds a second threshold or that the first number of REs exceeds the first threshold.

14. The method of claim 1, wherein transmitting the UL communication comprises transmitting the first UCI in the configured grant resource.

15. The method of claim 1, wherein transmitting the UL communication comprises transmitting the UL communication in the CG-PUSCH resource based at least in part on determining to transmit the first UCI in the CG-PUSCH resource.

16. The method of claim 1, further comprising:

determining whether the first number of parts exceeds a second threshold; and determining to remove the at least one part included in the first number of parts in response to determining that the first number of parts exceeds the second threshold, wherein transmitting the UL communication comprises transmitting the UL communication in the configured grant resource.

17. The method of claim 1, further comprising:

identifying the at least one part included in the first number of parts, wherein determining whether to transmit or to remove comprises determining whether to transmit the first UCI in the PUCCH resource or the CG-PUSCH resource further based on the at least one part.

18. The method of claim 1, wherein determining whether to transmit comprises determining whether the first UCI is associated with an aperiodic trigger.

19. The method of claim 1, further comprising:

identifying one or more subparts corresponding to the first number of parts, wherein determining whether to transmit or to remove comprises determining whether to transmit further based at least in part on the one or more subparts.

20. The method of claim 1, wherein determining whether the first number of REs exceeds the first threshold comprises determining whether a code rate associated with the CG-PUSCH resource exceeds a code rate threshold.

21. The method of claim 1, wherein determining whether to transmit the first UCI or to remove the at least one part comprises determining to remove the at least one part according to a predefined order in which the CSI-part 2 is removed before the CSI-part 1.

22. The method of claim 1, wherein determining whether to transmit the first UCI or to remove the at least one part is further based on which of the CSI-part 1, the CSI-part 2, or the HARQ-ACK is included in the first number of parts.

23. The method of claim 1, wherein the set of priority rules defines an order in which parts are removed.

24. An apparatus, comprising:

one or more memories;

one or more processors, coupled to the one or more memories, configured to:

determine that a physical uplink control channel (PUCCH) transmission in a time period overlaps with a configured grant resource, the PUCCH transmission including first uplink control information (UCI) including a first number of parts comprising at least one of a channel state information (CSI)-part 1 (CSI-part 1), a CSI-part 2, an acknowledgement (ACK), or a hybrid automatic repeat request acknowledgement (HARQ-ACK), and the configured grant resource including a configured grant UCI (CG-UCI) resource and a configured grant physical uplink shared channel (CG-PUSCH) resource;

determine whether a first number of resource elements (REs) occupied by the first UCI and a CG-UCI exceeds a first threshold, wherein the first threshold is based on a second number of REs of the configured grant resource excluding REs associated with transmitting a reference signal;

determine, based at least in part on determining whether the first number of REs exceeds the first threshold and further based at least in part on a set of priority rules, whether to;

transmit the first UCI in a PUCCH resource associated with the PUCCH transmission, transmit the first UCI in the CG-PUSCH resource, or remove at least one part included in the first number of parts; and transmit an uplink (UL) communication in accordance with determining whether to transmit or to remove.

25. The apparatus of claim 24, wherein the one or more processors are further configured to;

determine whether the first number of parts exceeds a second threshold, wherein, to determine whether to transmit or to remove, the one or more processors are configured to determine to remove based at least in part on determining whether the first number of parts exceeds the second threshold.

26. The apparatus of claim 25, wherein the second threshold is two.

27. The apparatus of claim 24, wherein the one or more processors are further configured to:

remove, based at least in part on determining to remove, the at least one part included in the first number of parts; and wherein, to transmit the UL communication, the one or more processors are configured to transmit a CG-PUSCH carrying a remaining number of parts included in the first UCI and the CG-UCI.

28. The apparatus of claim 24, wherein the first UCI includes the HARQ-ACK and the first number of parts is one.

29. The apparatus of claim 24, wherein, to determine whether the first number of REs exceeds the first threshold, the one or more processors are configured to determine whether the first number of REs exceeds the first threshold based on determining whether a code rate associated with the CG-PUSCH resource exceeds a code rate threshold.

30. The apparatus of claim 24, wherein, to determine whether to transmit the first UCI or to remove the at least one part, the one or more processors are configured to determine to remove the at least one part according to a predefined order in which the CSI-part 2 is removed before the CSI-part 1.

31. A non-transitory computer-readable medium storing a set of instructions, the set of instructions comprising:

one or more instructions, that when executed by one or more processors of a user equipment (UE) cause the UE to:

determine that a physical uplink control channel (PUCCH) transmission in a time period overlaps with a configured grant resource, the PUCCH transmission including first uplink control information (UCI) including a first number of parts comprising at least one of a channel state information (CSI)-part 1 (CSI-part 1), a CSI-part 2, an acknowledgement (ACK), or a hybrid automatic repeat request acknowledgement (HARQ-ACK), and the configured grant resource including a configured grant UCI (CG-UCI) resource and a configured grant physical uplink shared channel (CG-PUSCH) resource;

determine whether a first number of resource elements (REs) occupied by the first UCI and a CG-UCI exceeds a first threshold, wherein the first threshold is based on a second number of REs of the configured grant resource excluding REs associated with transmitting a reference signal;

determine, based at least in part on determining whether the first number of REs exceeds the first threshold and further based at least in part on a set of priority rules, whether to;

transmit the first UCI in a PUCCH resource associated with the PUCCH transmission, transmit the first UCI in the CG-PUSCH resource, or remove at least one part included in the first number of parts; and transmit an uplink (UL) communication in accordance with determining whether to transmit or to remove.

32. The non-transitory computer-readable medium of claim 31, wherein, when causing the UE to transmit the UL communication, the one or more instructions cause the UE to transmit the UL communication in the PUCCH resource, and wherein the UL communication includes the first UCI.

33. The non-transitory computer-readable medium of claim 31, wherein, when causing the UE to transmit the UL communication, the one or more instructions cause the UE to transmit the UL communication in the configured grant resource, and wherein the UL communication includes the CG-UCI multiplexed with a subset of the first number of parts and a CG-PUSCH.

34. The non-transitory computer-readable medium of claim 31, wherein the first number of parts is three, and the first UCI includes the CSI-part 1, the CSI-part 2, and the HARQ-ACK.

35. The non-transitory computer-readable medium of claim 34, wherein the one or more instructions, that when executed by the one or more processors, further cause the UE to:

remove the CSI-part 2 from the first UCI;

update the first number of REs based at least in part on removing the CSI-part 2 to obtain an updated first number of REs;

update the first number of parts based at least in part on removing the CSI-part 2 to obtain an updated first number of parts; and determine whether the updated first number of parts exceeds a second threshold and whether the updated first number of REs exceeds the first threshold, wherein, when causing the UE to transmit the UL communication, the one or more instructions cause the UE to selectively transmit the UL communication in the configured grant resource based at least in part on determining whether the updated first number of parts exceeds the second threshold and the updated first number of REs exceeds the first threshold, the UL communication including the CG-UCI multiplexed with the CSI-part 1, the HARQ-ACK, and a CG-PUSCH.

36. The non-transitory computer-readable medium of claim 35, wherein the one or more instructions, that when executed by the one or more processors, further cause the UE to:

the first threshold as a product of;

a scaling factor that is less than one, and a total number of REs associated with a number of symbols of the configured grant resource that excludes REs used for transmitting the reference signal.

37. The non-transitory computer-readable medium of claim 35, wherein the updated first number of parts is two, and wherein the first UCI includes the CSI-part 1 and the HARQ-ACK.

38. The non-transitory computer-readable medium of claim 35, wherein the one or more instructions, that when executed by the one or more processors, further cause the UE to:

remove the CSI-part 1 from the first UCI;

update the updated first number of REs based at least in part on removing the CSI-part 1 to obtain a further updated first number of REs;

updating the updated first number of parts based at least in part on removing the CSI-part 1 to obtain a further updated first number of parts; and determine whether the further updated first number of parts exceeds the second threshold and whether the further updated first number of REs exceeds the first threshold, wherein, when causing the UE to transmit the UL communication, the one or more processors cause the UE to selectively transmit the UL communication in the configured grant resource based at least in part on determining whether the further updated first number exceeds the second threshold and whether the further updated first number of REs exceeds the first threshold, and wherein the UL communication includes the CG-UCI multiplexed with the HARQ-ACK and a CG-PUSCH.

39. The non-transitory computer-readable medium of claim 31, wherein the first UCI includes a HARQ-ACK and the first number of parts is one.

40. An apparatus, comprising:

means for determining that a physical uplink control channel (PUCCH) transmission in a time period overlaps with a configured grant resource, the PUCCH transmission including first UL control information (UCI) including a first number of parts comprising at least one of a channel state information (CSI)-part 1 (CSI-part 1), a CSI-part 2, an acknowledgement (ACK), or a hybrid automatic repeat request acknowledgement (HARQ-ACK), and the configured grant resource including a configured grant UCI (CG-UCI) resource and a configured grant physical uplink shared channel (CG-PUSCH) resource;

means for determining whether a first number of resource elements (REs) occupied by the first UCI and a CG-UCI exceeds a first threshold, wherein the first threshold is based on a second number of REs of the configured grant resource excluding REs associated with transmitting a reference signal;

means for determining, based at least in part on determining whether the first number of REs exceeds the first threshold and further based at least in part on a set of priority rules, whether to:

transmit the first UCI in a PUCCH resource associated with the PUCCH transmission, transmit the first UCI in the CG-PUSCH resource, or remove at least one part included in the first number of parts; and means for transmitting an uplink (UL) communication in accordance with determining whether to transmit or to remove.

* * * * *